United States Patent
Son et al.

(10) Patent No.: US 12,256,318 B2
(45) Date of Patent: Mar. 18, 2025

(54) METHOD AND APPARATUS FOR AUTHENTICATION BETWEEN CORE NETWORK DEVICES IN MOBILE COMMUNICATION SYSTEM

(71) Applicant: SAMSUNG ELECTRONICS CO., LTD., Suwon-si (KR)

(72) Inventors: Jungje Son, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 17/659,804

(22) Filed: Apr. 19, 2022

(65) Prior Publication Data

US 2022/0338104 A1 Oct. 20, 2022

(30) Foreign Application Priority Data

Apr. 20, 2021 (KR) .................. 10-2021-0051321
May 7, 2021 (KR) .................. 10-2021-0059580

(51) Int. Cl.
*H04W 48/16* (2009.01)
*H04W 4/50* (2018.01)
*H04W 12/06* (2021.01)

(52) U.S. Cl.
CPC ............. *H04W 48/16* (2013.01); *H04W 4/50* (2018.02); *H04W 12/06* (2013.01)

(58) Field of Classification Search
CPC ....... H04W 48/16; H04W 4/50; H04W 12/06; H04W 8/00; H04L 41/0894
See application file for complete search history.

(56) References Cited

U.S. PATENT DOCUMENTS

2021/0281658 A1  9/2021  Kweon et al.
2022/0014599 A1  1/2022  Zhang
(Continued)

FOREIGN PATENT DOCUMENTS

KR  10-2021-0112868 A   9/2021
WO     2020/221219 A1  11/2020
WO     2021/017771 A1   2/2021

OTHER PUBLICATIONS

"3rd Generation Partnership Project; Technical Specification Group Services and System Aspects; Security architecture and procedures for 5G system (Release 17)", 3GPP TS 33.501 V17.1.0 (Mar. 2021), 256 pages.
(Continued)

*Primary Examiner* — Mazda Sabouri

(57) ABSTRACT

A communication method of a network function (NF) consumer in a wireless communication system according to an embodiment of the disclosure may include: receiving, from an NF repository function (NRF), a discovery response message in a discovery procedure, the discovery response message including NF set information including NF instance identifiers (IDs) for providing a service; transmitting, to the NRF, an access token request message including an NF producer instance ID; receiving, from the NRF, an access token response message including an access token; transmitting, to a service communication proxy (SCP), a service request message to be transmitted to an NF producer instance, the service request message including the token received from the NRF, a client credentials assertion (CCA) of the NF consumer, and the NF set information; and receiving, from the SCP, a service response message including a CCA of the NF producer instance.

10 Claims, 10 Drawing Sheets

(56) References Cited

U.S. PATENT DOCUMENTS

| | | | |
|---|---|---|---|
| 2022/0052989 A1 | 2/2022 | Zhao | |
| 2022/0294775 A1* | 9/2022 | Singh | H04L 63/0884 |
| 2023/0396602 A1* | 12/2023 | Wu | H04W 12/009 |

OTHER PUBLICATIONS

Nokia et al., "Service response verification in indirect communication", 3GPP TSG-SA3 Meeting #102Bis-e, Mar. 1-5, 2021, S3-211217, 2 pages.

"3rd Generation Partnership Project; Technical Specification Group Services and System Aspects; Procedures for the 5G System (5GS); Stage 2 (Release 17)", 3GPP TS 23.502 V17.0.0 (Mar. 2021), 637 pages.

International Search Report dated Jul. 26, 2022 in connection with International Patent Application No. PCT/KR2022/005583, 3 pages.

Written Opinion of the International Searching Authority dated Jul. 26, 2022 in connection with International Patent Application No. PCT/KR2022/005583, 5 pages.

3GPP TR 33.875 V0.2.0 (Mar. 2021); Technical Report; 3rd Generation Partnership Project; Technical Specification Group Services and System Aspects; Study on enhanced security aspects of the 5G Service Based Architecture (SBA); (Release 17), 20 pages.

\* cited by examiner

METHOD AND APPARATUS FOR AUTHENTICATION BETWEEN CORE NETWORK DEVICES IN MOBILE COMMUNICATION SYSTEM

CROSS-REFERENCE TO RELATED APPLICATION(S)

This application is based on and claims priority under 35 U.S.C. § 119 to Korean Patent Application Nos. 10-2021-0051321 and 10-2021-0059580, filed on Apr. 20, 2021, and May 7, 2021, in the Korean Intellectual Property Office, the disclosures of which are herein incorporated by reference in their entirety.

BACKGROUND

1. Field

The disclosure relates to a method and an apparatus for authentication between network devices in a mobile communication system and, more particularly, to a method and an apparatus for authentication and authority management of a network device in a connection between network devices.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "Beyond 4G Network" or a "Post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

The disclosure relates to a method for authentication and authority management of a network device to be notified of data of a UE in connection between network devices in a mobile communication system for network access and data reception management of a mobile communication system UE.

A communication method of a network function (NF) consumer in a wireless communication system according to an embodiment of the disclosure may include: receiving, from an NF repository function (NRF), a discovery response message in a discovery procedure, the discovery response message including NF set information including NF instance identifiers (IDs) for providing a service; transmitting, to the NRF, an access token request message including an NF producer instance ID; receiving, from the NRF, an access token response message including an access token; transmitting, to a service communication proxy (SCP), a service request message to be transmitted to an NF producer instance, the service request message including the token received from the NRF, a client credentials assertion (CCA) of the NF consumer, and the NF set information; and receiving, from the SCP, a service response message including a CCA of the NF producer instance.

A method for relaying communication between a network function (NF) consumer and an NF producer by a service communication proxy (SCP) in a mobile communication system according to an embodiment of the disclosure may include: receiving, from the NF consumer, a service request message to be transmitted to the NF producer, the service request message including an NF set including NF producer instance identifications (IDs); transmitting, to the NF producer, the service request message; receiving, from the NF producer instance, a service response message including a client credentials assertion (CCA) of an NF producer instance; and transmitting, to the NF consumer, the service response message.

An apparatus according to an embodiment of the disclosure corresponds to a network function (NF) consumer in a wireless communication system and may include: a network interface configured to communicate with at least one NF; a memory; and at least one processor configured to perform control to receive, from an NF repository function (NRF), a discovery response message in a discovery procedure, the discovery response message including NF set information including NF instance identifiers (IDs) for providing a service, transmit, to the NRF, an access token request message including an NF producer instance ID, receive, from the NRF, an access token response message including an access token, transmit, to a service communication proxy (SCP), a service request message to be transmitted to an NF producer instance, the service request message including the token received from the NRF, a client credentials assertion (CCA) of the NF consumer, and the NF set information, and receive, from the SCP, a service response message including a CCA of the NF producer instance.

An apparatus according to an embodiment of the disclosure corresponds to a service communication proxy (SCP) for relaying communication between a network function (NF) consumer and an NF producer in a mobile communication system and may include: a network interface configured to communicate with at least one NF; a memory; and at least one processor configured to perform control to receive, from the NF consumer, a service request message to be transmitted to the NF producer, the service request message including an NF set including NF producer instance identifications (IDs), transmit, to the NF producer, the service request message, receive, from the NF producer instance, a service response message including a client credentials assertion (CCA) of an NF producer instance, and transmit, to the NF consumer, the service response message.

According to the disclosure, a service may be requested between network devices through a subscription and notification model, and authentication and authorization for the service may be performed. In particular, a service consumer may directly request a service from a service provider, and the service provider may request a service from a second service provider as a service consumer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
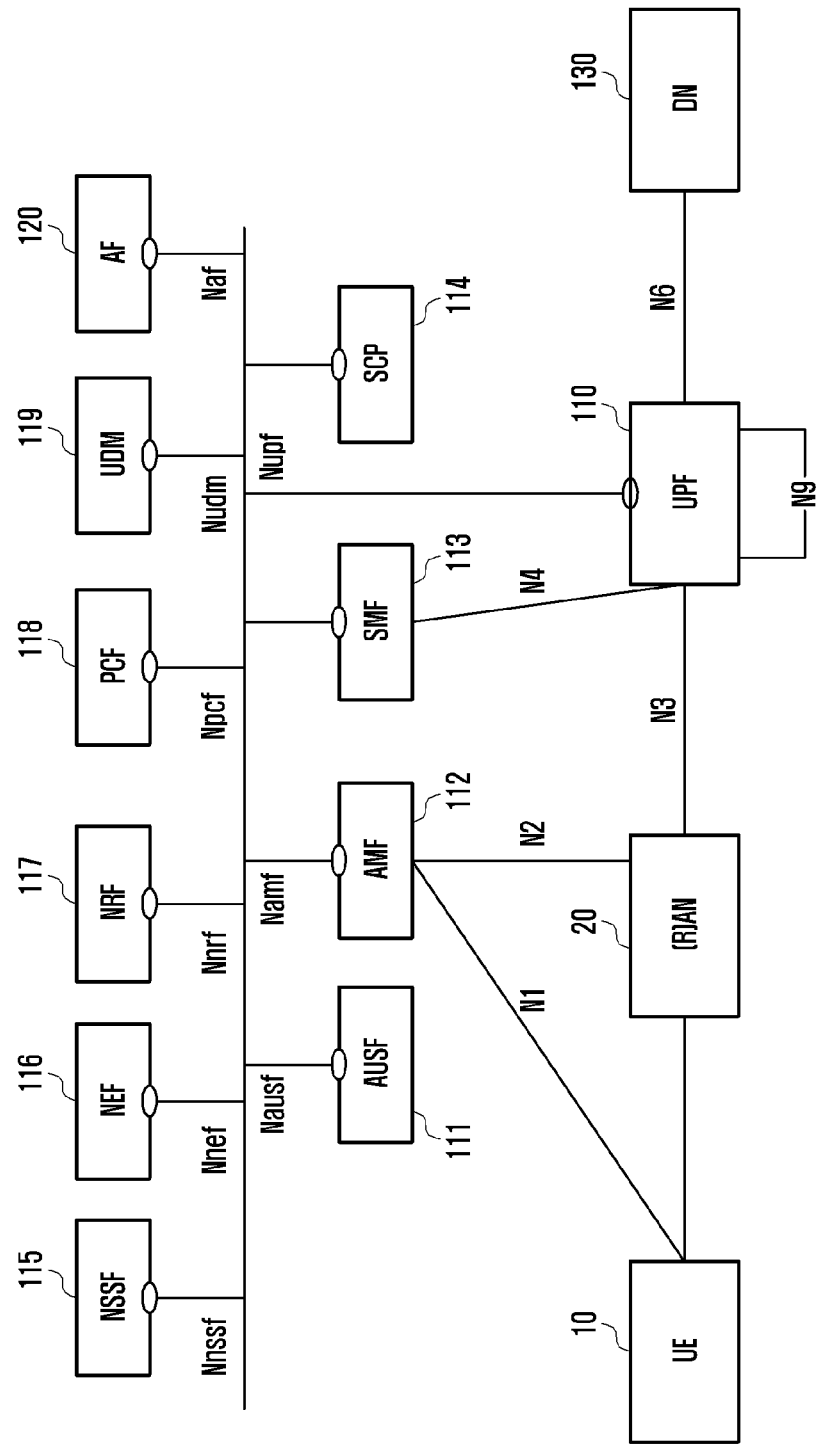
FIG. 1 illustrates the structure of a 5G mobile communication system according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in detail with reference to the accompanying drawings. Here, it should be noted that like components are denoted by like reference numerals in the accompanying drawings if possible. It should be also noted that the drawings of the disclosure attached below are provided to assist understanding of the disclosure, and the disclosure is not limited to forms or arrangements illustrated in the drawings of the disclosure. In addition, detailed descriptions of well-known functions and components that may make the gist of the disclosure unclear will be omitted. It should be noted that in the following description, only parts necessary for understanding operations according to various embodiments of the disclosure are described, and descriptions of other parts will be omitted so as not to obscure the gist of the disclosure.

FIG. 1 is a structural diagram of a 5G mobile communication system according to an embodiment of the present disclosure.

Before referring to FIG. 1, a unit performing each function in a core network of the 5G mobile communication system may be defined as a network function (NF). A network function may be configured in a specific server or network device. When a network function is configured in a specific server or network device, two or more network functions may be mounted in one specific server (or network device). A network function being mounted may mean that the network function operates as a device that performs the network function. When a network function is mounted in a server, two or more different network functions performing the same function may be mounted. Two or more different network functions may be network functions controlling the same operation, or may be different network functions.

In an illustrative case where two or more identical network functions are included in one server, two or more user plane functions (UPFs) providing user data to a user equipment (UE) may exist in one server. In another illustrative case where different network functions are mounted in one server, a UPF and a session management function (SMF) may be mounted in one server.

In still another example, one network function may be configured by two or more different servers (or network devices). For example, one UPF may be configured through two or more servers.

As described above, network functions of the 5G core network described in this specification are terms for referring to one entity that performs a specific operation within the network, and it should be noted that a network function may be configured as a server or network device rather than a simple function.

Referring to FIG. 1, a UE 10 may be a terminal capable of accessing at least the 5G network. The UE 10 may access various networks, such as a 4G network and/or a Wi-Fi network, in other wireless access modes. The UE 10 may have various forms. For example, the UE 10 may be configured as a terminal providing only an IoT function, may be a smart or tablet computer, or may be configured as a wearable-type device, such as a smart watch or smart glasses. In the disclosure, the UE 10 is not particularly limited in configured type.

A radio access node ((R)AN) 20 may be a network node that transmits and receives a signal or data on air to and from the UE 10 in a 5G radio access mode. The (R)AN 20 may collectively refer to a new radio access network supporting both evolved E-UTRA (E-UTRA) as an evolved version of 4G radio access technology, and new radio access technology (new radio: NR) (e.g., gNB).

Next, NFs forming the 5G core network are described. The NFs illustrated in FIG. 1 may include a user plane function (UPF) 110, an authentication server function (AUSF) 111, an access and mobility management function (AMF) 112, a session management function (SMF) 113, a service communication proxy (SCP) 114, a network slice selection function (NSSF) 115, a network exposure function (NEF) 116, an NF repository function (NRF) 117, a policy and control function (PCF) 118, a unified data management (UDM) 119, and an application function (AF) 120.

The UPF 110 may transmit a downlink protocol data unit (PDU) received from a DN 130 to the UE 10 via the (R)AN 20, and may transmit an uplink PDU received from the UE 10 via the (R)AN 20 to the DN 130. Specifically, the UPF 110 may support an anchor point for intra/inter RAT mobility, an external PDU session point of interconnection to a data network, packet routing and forwarding, a user plane part of packet inspection and policy rule enforcement, lawful interception, traffic usage reporting, an uplink classifier for supporting routing of traffic flow to a data network, a branching point for supporting a multi-homed PDU session, QoS handling for a user plane (e.g. packet filtering, gating, and uplink/downlink rate implementation), uplink traffic verification (SDF mapping between service data flow (SDF) and QoS flow), transport-level packet marking in an uplink and a downlink, and a downlink packet buffering and downlink data notification triggering functions.

The AUSF 111 may process and store data for authentication of the UE 10. Further, the AUSF 111 may perform authentication of the UE 10 in a $3^{rd}$ generation partnership project (3GPP) access network and a non-3GPP access network.

The AMF 112 may provide a function for access and mobility management in UE units, and may basically be connected to one AMF per UE. Specifically, the AMF 112 may support functions of signaling between CN nodes for mobility between 3GPP access networks, termination of a radio access network (RAN) CP interface (i.e., an N2 interface), termination of NAS signaling (N1), NAS signaling security (NAS ciphering and integrity protection), AS security control, registration management (registration area management), connection management, idle mode UE reachability (including control and conduction of paging retransmission), mobility management control (subscription and policy), intra-system mobility and inter-system mobility support, network slicing support, SMF selection, lawful interception (for an AMF event and interface to an LI system), transmission and provision of a session management (SM) message between the UE and the SMF, a transparent proxy for SM message routing, access authentication, access authorization including a roaming authority check, transmission and provision of an SMS message between the UE and a short message service function (SMSF), a security anchor function (SAF), and/or security context management (SCM). Some function(s) or all functions of the AMF 112 may be supported within a single AMF instance operating as one AMF. Further, the AMF 112 may include a security anchor function (SEAF) responsible for a security-related function of the UE 10.

The SMF 113 may provide a session management function, and when the UE 10 has a plurality of sessions, each session may be managed by a different SMF. Specifically, the SMF 113 may support functions of session management (e.g., session establishment, modification, and termination including maintaining a tunnel between a UPF and an AN node), UE IP address allocation and management (optionally including authentication), selection and control of a UP function, configuration of traffic steering for the UPF to route traffic to an appropriate destination, termination of an interface towards policy control functions, implementation of a control part of a policy and quality of service (QoS), lawful interception (for an SM event and an interface to the LI system), termination of an SM part of an NAS message, downlink data notification, an initiator of AN-specific SM information (transmitted to an AN through N2 via the AMF), SSC mode determination of a session, and a roaming function. As described above, some function(s) or all functions of the SMF 113 may be supported within a single SMF instance operating as one SMF.

The SCP 114 may provide indirect communication through the SCP 114 between specific different NFs. Also, the SCP 114 may perform secure communication, for example, may authorize an NF service consumer to access to an NF service producer API, and may perform load balancing, monitoring, overload control, and the like. That is, the SCP 114 may provide an indirect communication path between two or more specific different NFs.

The NSSF 115 may perform selection of a network slice instance set serving the UE 10, allowed NSSAI determination and mapping to a subscribed S-NSSAI if necessary, configured NSSAI determination and mapping to a subscribed S-NSSAI if necessary, determination of an AMF set to be used to serve the UE 10, and determination of a list of a candidate AMF(s), by querying the NRF 117 if possible, based on a configuration.

The NEF 116 may expose an NF capability and an event to an external network. In addition, the NEF 116 may store and retrieve information as structured data using a standardized interface (Nudr) for a unified data repository (UDR).

The NRF 117 supports a service retrieval function. The NRF 117 receives an NF retrieval request from an NF instance or the SCP 114 and provides retrieved information about an NF instance (target of retrieval) to the NF instance or the SCP 114. The NRF 117 supports P-CSCF discovery and maintains an NF profile of an available NF instance and a supported service. The NRF 117 notifies a subscribing NF service consumer or the SCP 114 that has subscribed with an NF service of a newly registered/updated/deregistered NF instance along with an NR service.

The PCF 140 may receive information about packet flow from an application server and may provide a function of determining a policy, such as mobility management and session management. Specifically, the PCF 140 may support functions of supporting a unified policy framework for controlling a network operation, providing a policy rule so that a control plane function(s) (e.g., the AMF and the SMF) may enforce the policy rule, and configuring a front end to access relevant subscription information for policy making in the user data repository (UDR).

The UDM 170 may store subscription data about a user, policy data, and the like. The UDM 170 may include two parts, that is, an application front end (FE, not shown) and the user data repository (UDR, not shown).

The AF 120 may interoperate with a 3GPP core network to provide a service (e.g., support functions, such as impact of an application on traffic routing, access to network capability exposure, and an interaction with a policy framework for policy control).

The application function (AF) 120 interacts with the 3GPP core network to provide a service. For example, the AF 120 may perform an operation related to traffic routing of an application, access to the NEF 116, and an interaction with a policy framework for policy control.

The DN 130 may refer to, for example, an operator service, Internet access, or a third-party service. The DN 130 may transmit a downlink protocol data unit (PDU) to the UPF 110 or may receive a PDU transmitted from the UE 10 through the UPF 110.

The UE 10 may be provided with a service, such as access to the 5G network and data transmission/reception, through the 5G core network illustrated in FIG. 1. The 5G core network may perform communication between the NFs to manage the UE 10. Here, the NFs may operate as NF consumers and NF producers to communicate with each other. An NF producer is a server that enables NF consumers to connect and to receive a service from the NF producer. An NF consumer connects to an NF producer and uses a service provided by the NF producer. The NF producer and the NF consumer may perform an operation required for control or management related to the UE 10 or a network using a service provided by the NF producer.

The NF producer may provide a service in response to a service request from the NF consumer. In addition, when a required condition is satisfied, the NF producer may provide a notification service for providing data. Here, the NF producer may provide the notification service, based on information registered when an NF consumer subscribing to the notification service subscribes to the service.

According to an embodiment of the disclosure, the NF consumer and the NF producer may directly communicate or may communicate via the SCP 114. The NF consumer may transmit a service request to the NF producer to the SCP 114, and the SCP 114 may transmit the received service request of the NF consumer to the NF producer upon request. Both communication between an NF and an NF and communication between an NF and the NRF may be performed through the SCP 114. Here, since the NF producer does not communicate directly with the NF consumer, the NF consumer may be authenticated through a client credentials assertion (CCA) provided in (or together with) a service request message by the NF consumer.

Figure 2:
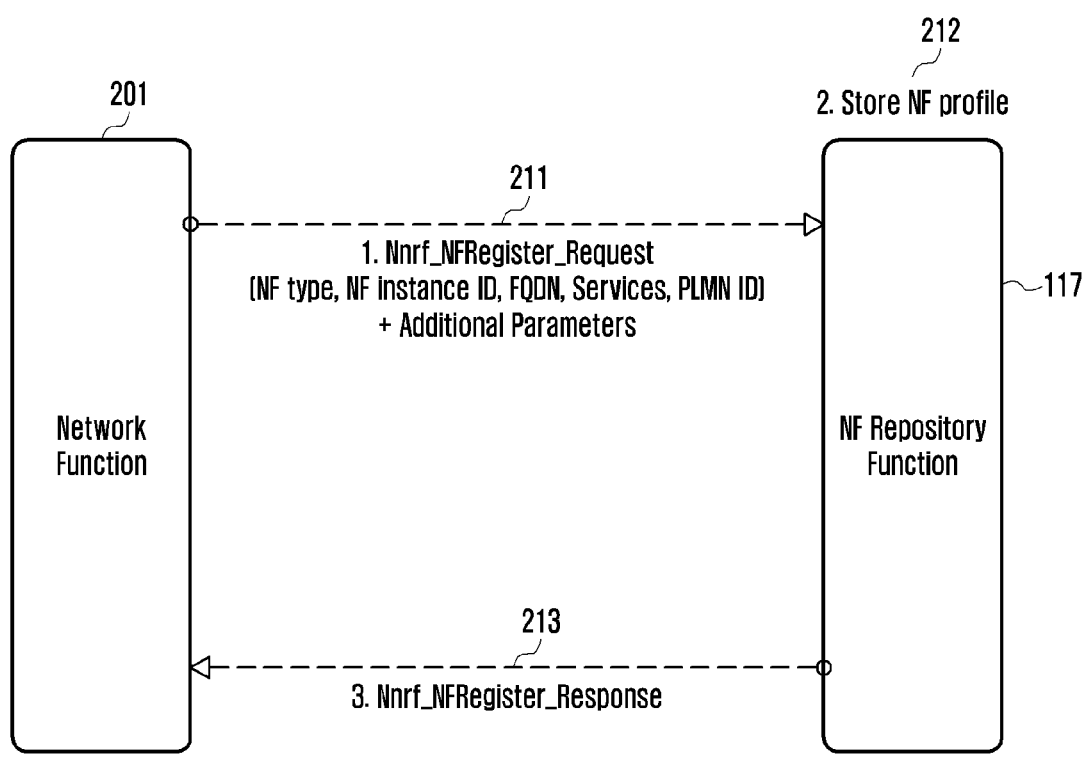
FIG. 2 illustrates a system registration procedure of a network device according to an embodiment of the present disclosure.

FIG. 2 illustrates a system registration procedure of a network device according to an embodiment of the present disclosure.

Referring to FIG. 2, as described with reference in FIG. 1, a network function (NF) 201 may be configured as one device or server. The NF 201 may be any one of the NFs existing in the 5G core network illustrated in FIG. 1, or may include the AF 120 connected via the NEF 116.

A procedure for the NF 201 to register with the NRF 117 is described in FIG. 2. When starting an initial operation (or being activated), the NF 201 may transmit an NF register request message for registering an NF profile in the NRF 117 to the NRF 117 the network as shown in operation 221.

The NF profile of the NF may include some or all of the following pieces of information:

NF type: May include type information indicating the type of the NF, such as the AMF 112 and the SMF 113;
NF Instance ID: May include an ID indicating a network function instance;

IP address of NF or fully qualified domain name (FQDN);
Information, such as names of supported NF services;
Information about a PLMN to which the NF belongs; or
ID range or ID information of UE or subscriber information managed by the NF.

Among the above pieces of information, the network function instance corresponds to a case in which one specific NF may be configured in the form of an instance. For example, NFs, the AMF 112, the SMF 113, and the UPF 110, forming the 5G core network may include two or more instances performing the same operation. Each instance may perform the same specific function described in FIG. 1. For example, two different UPFs 110 may include UPF instances, and both of the two UPF instances may provide user plane data to the same UE. In this case, each UPF instance may provide different user data. For example, one specific UPF instance may be a UPF that provides a download data service, and the other UPF instance may be a UPF that provides data upload. In another example, one specific UPF instance may provide a movie streaming service, and the other UPF instance may provide a chatting service. Although instance types have been illustrated above, the same may be applied to a case in which two or more different UPFs provide different services to one UE. In another example, two or more UPFs or UPF instances may be configured based on the total amount of data that a UPF can provide.

Referring back to FIG. 2, in operation 211, the NF 201 may add URI address information (response URI) for receiving data when the NF receives a service from another NF to the NF profile registered in the NRF 117. Further, when the NF 201 operates as an NF producer that provides a service to a different NF, the NF 201 may add, to the NF profile, an NF type or an NF instance ID that can operate as an NF consumer to be provided with a service of the NF producer.

When receiving a request message for registering the NF profile received from the NF 201, the NRF 117 may store the NF profile of the NF 201 in operation 212, and may then generate and transmit an NF register response message to the NF 201 in response to the NF register request in operation 213.

Figure 3:
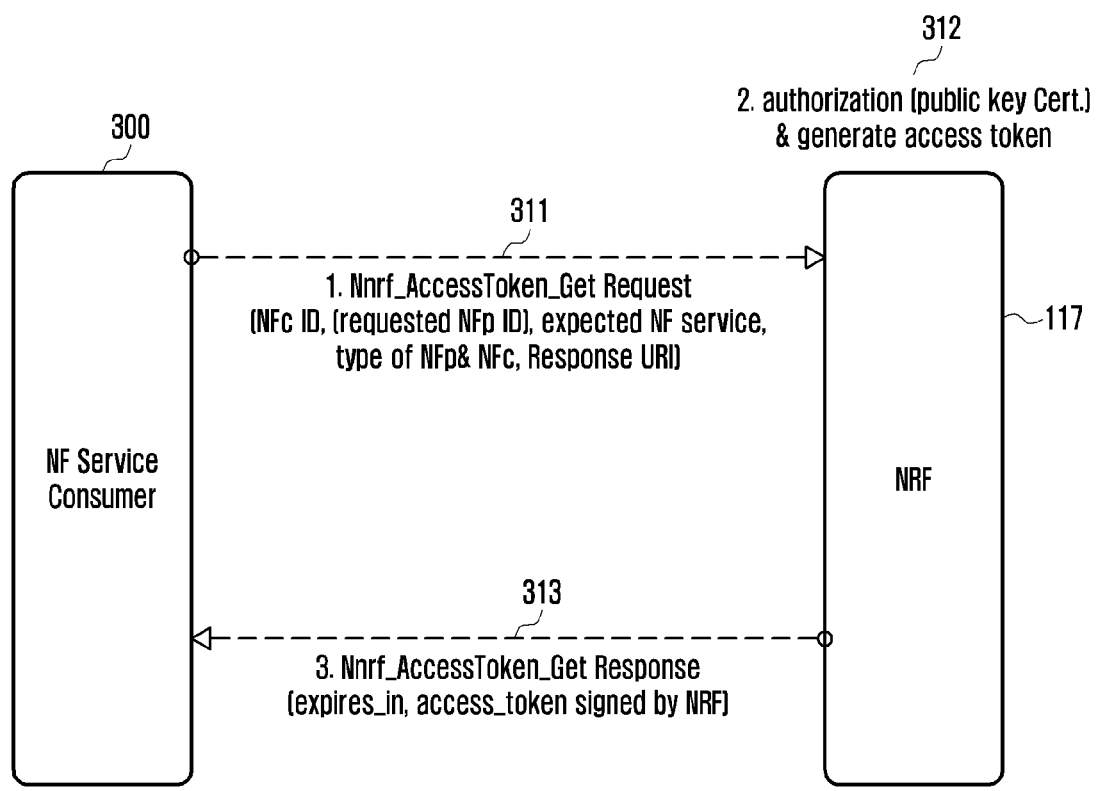
FIG. 3 illustrates an access authorization and token obtaining procedure of a network device according to an embodiment of the present disclosure.

FIG. 3 illustrates a procedure in which an NF consumer obtains access authorization and token from an NRF to receive a service from an NF producer when wishing to receive the service from the NF producer according to an embodiment of the present disclosure.

Before referring to FIG. 3, an NF service consumer and an NF consumer have the same meaning, and will be described as the same NF in the following description. Therefore, although mixed, the NF service consumer and the NF consumer will be understood as having the same meaning. An NF service producer and an NF producer have the same meaning, and will be described as the same NF in the following description. Therefore, although mixed, the NF service producer and the NF producer will be understood as having the same meaning.

Referring to FIG. 3, in operation 311, the NF service consumer 300 may transmit an access token get request message to the NRF 117 to request access authorization from the NF producer from which the NF service consumer 300 wishes to receive a service. Here, the NF consumer 300 may include all or some of the following information in the access token get request message:
NF instance ID and NF type of the NF consumer;
Information about an NF service for which the NF consumer wishes to obtain access authorization; or
Information about the NF type and the NF producer instance ID of the NF producer from which the NF consumer wishes to obtain access authorization.

Further, the NF consumer 300 may include, in the access token get request message, a response uniform resource identifier (URI) of the NF consumer indicating an address for receiving a response from the NF producer when using a service of the NF producer.

After the NRF 117 receives the access token get request message from the NF consumer 300, the NRF 117 may determine (or identify or retrieve) the possibility of permission regarding whether the NF consumer 300 can access the requested service of the NF producer in operation 312. Here, when the NF producer has previously registered with the NRF 117 or there is a list of NF types or NF instant IDs for which the requested service provided by the NF producer is permissible through preset information, the NRF 117 may identify whether the request is a request for which access authorization is granted using information about whether the NF consumer 300 is included in the list in operation 312.

In addition, the NRF 117 may determine (or identify) whether the response URI included in the access token get request message is a URI included in a list of response URIs previously registered by the NF consumer 300 in the NRF 117 or a URI using a host address indicated by an FQDN or IP address registered by the NF consumer 300 in operation 312, and may check (identify) whether a request included in the access token get request message of the NF consumer 300 is an appropriate request or a request for which access authorization may be granted.

In another embodiment of the disclosure, the NF consumer 300 may include an IP address thereof, a FQDN thereof, or URI information to be used for a response URI thereof in an authentication certificate thereof in operation 311. Accordingly, the NRF 117 may receive an access token get request message including the above information from the NF consumer 300. Then, in operation 312, the NRF 117 may determine (or identify) whether the information of the response URI included in the access token request message is a URI included in a response URI list included in the authentication certificate of the NF consumer 300 or a URI using a host address indicated by the FQDN or the IP address included in the authentication certificate and may check whether a request included in the access token get request message of the NF consumer 300 is an appropriate request or a request for which access authorization may be granted.

When the NRF 117 determines that an expected service of the NF producer is available for the NF consumer 300, the NRF 117 may issue the NF consumer 300 with a token including information, such as an NRF ID, an NF instance ID of the NF consumer 300, a requested NF producer type, and an NF instance ID of an NF producer if a requested NF producer instance is designated, in operation 313. Here, the token may be with an encryption key of the NRF 117.

Further, the token issued by the NRF 117 may include time information indicating the validity period of the token.

In addition, the NRF 117 may include information, such as the FQDN or IP address and the response URI of the NF consumer 300 in the token issued to the NF consumer 300 in operation 313, thereby enabling the NF producer to identify the requested response URI is the correct URI of the NF consumer 300. Here, the response URI may include the information of the response URI included in the access token get request message of the NF consumer 300. When the response URI is not included in the access token get request message of the NF consumer 300, the NRF 117 may include all or part of information of the response URI list previously registered by the NF consumer.

In operation 313, the NRF 117 may transmit a response including the token signed with the encryption key thereof to an access token get request message to the NF consumer 300.

Figure 4:
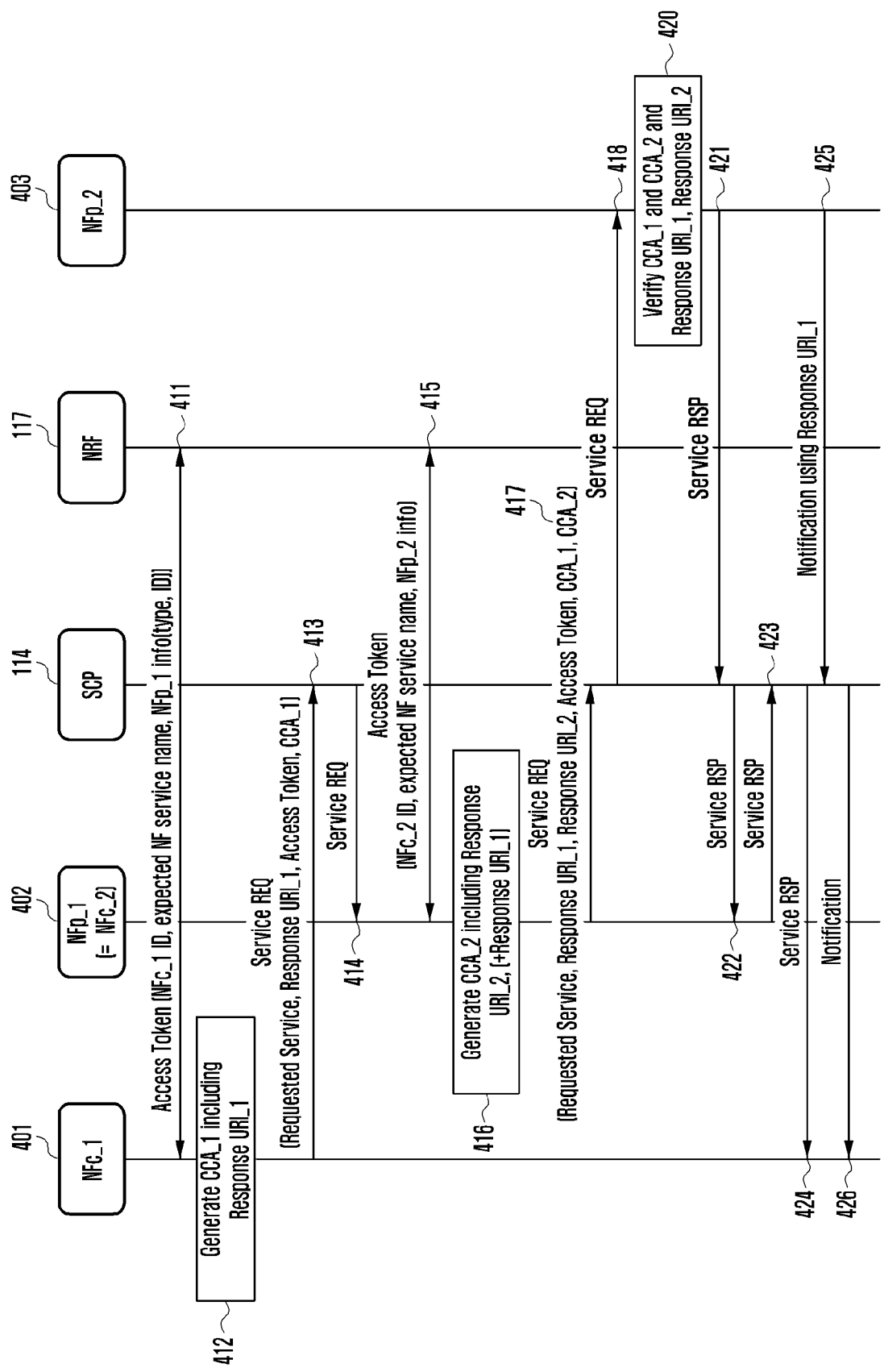
FIG. 4 illustrates an authentication and authorization procedure of a service request and response of a subscription-notification model between network devices using a network device authentication certificate according to an embodiment of the present disclosure.

FIG. 4 is a signal flowchart illustrating an authentication and authorization procedure of a service request and response of a subscription-notification model between network devices using a network device authentication certificate according to an embodiment of the present disclosure.

Prior to a description with reference to FIG. 4, network functions used in the disclosure will be described. First, an NF consumer 401 is shown as NFc_1, and an NF producer is shown as a form in which two different NF producers exist. Therefore, the first NF producer 402 is shown as NFp_1, and a second NF producer 403 is shown as NFp_2. Further, it is assumed that components of the SCP 114 and the NRF 117 described in FIG. 1 are used. NFp_1 may also operate as a second NF consumer in a specific case. That is, one NF may operate as NFp_1, and may operate as NFc_2 at the same time in a specific case, which will be illustrated in FIG. 4 and will be further described with reference to the signal flowchart of FIG. 4.

According to the embodiment of the disclosure, an NF consumer may subscribe to a notification service of an NF producer and may then receive the notification service from the NF producer without any request. The NF producer may receive a request for the notification service from the NF consumer, may accept the request, and, if necessary to provide the service in response to the request, may request a different NF producer (referred to as NF Producer_2 in the example of FIG. 4) to provide the notification service to the NF consumer.

For example, an NEF 116 may request, as an NF consumer, a notification service from a UDM 119 to provide the notification service with respect to an event, such as a location change and a network connection state change of a specific UE, according to a request of an AF. Here, the UDM 119 may operate as an NF producer of the notification service. The NEF 116 may register a URI of the NEF 116 to transmit the notification service to the UDM 119 as a response URI. The UDM 119 may subscribe to a notification service of the AMF 112 for the event in order to obtain information about the event, such as the network connection state change of the UE, from the AMF 112. Here, the UDM 119 subscribes to the notification service of the AMF 112 as a different NF consumer (referred to as NF Consumer_2). The AMF 112 operates as an NF producer (referred to as NF Producer_2). Here, the UDM 119 may use a response URI of NF Consumer_1, that is, the response URI received from the NEF 116, other than a response URI of NF Consumer_2, as a receiver URI of the notification service to the AMF 112 for the event.

According to the embodiment of FIG. 4, NF Consumer_1 410 may determine a notification service subscription to NF Producer_1 402 for a specific event for a specific UE or a group of UEs. The specific event may be represented by an event ID.

For a request for the notification service subscription to the NF producer, NF Consumer_1 401 may perform authorization and be issued with a token from an NRF 117 to transmit a service request message in operation 411.

In operation 412, NF Consumer_1 401 may generate a CCA certificate of NF Consumer_1 401 so that the NF producer receiving the service request message may authenticate NF Consumer_1 401.

In operation 413, NF Consumer_1 401 may transmit the service request message to the SCP 114 or may directly transmit the service request message to the NF producer (not shown in FIG. 4) in order to request the notification service subscription to the NF producer. The service request message may include the event ID indicating the requested event, UE ID information indicating information about a related UE, the CCA certificate, and the token received from the NRF 117.

In the embodiment of the disclosure, the CCA may include an NF instance ID of the NF consumer 401, time information indicating the validity period of the certificate, an expected NF type of the NF producer, and a digital certificate of the NF consumer or URL information about the digital certificate. Further, the CCA may include a response to a service request included in the service request message or response URI information about an NF from which a service is provided. The CCA of the NF may be signed with a signature key.

In operation 414, the SCP 114 may transmit the service request message received from NF Consumer_1 401 to NF Producer_1 402.

NF Producer_1 402 may verify the token and the CCA certificate included in the received service request message to authenticate NF Consumer_1 401 that has transmitted the service request message, and may check whether NF Consumer_1 401 is an NF that has received access authorization from the NRF 117. NF Producer_1 402 may check that the response URI included in the service request message and the response URI attached to the CCA certificate are a URI of NF Consumer_1 401 in operation 415.

In another embodiment of the disclosure, when an FQDN or an IP address is included in the digital certificate of the NF producer, NF Producer_1 402 may check whether the response URI included in the service request message and the CCA uses a host address indicated by the FQDN or the IP address, thereby checking whether the service request message of NF Consumer_1 401 is an appropriate service request message.

NF Producer_1 402 may determine to need to request a notification service for the event from a different NF producer, which is NF Producer_2 403, in order to provide the notification service for the event included in the service request message received from NF Consumer_1 401.

NF Producer_1 402 is an NF consumer (referred to as NF Consumer_2), and may request a token from the NRF 117 to request the service from NF Producer_2 403 in operation 415. Here, the token request may include an ID of NF Consumer_2, a requested NF type of NF Producer_2, and requested NF service information.

After receiving the token from the NRF 117, NF Consumer_2 402 may configure a service request message to request a notification service subscription to NF Producer_2 403 in operation 416, and may transmits the service request message to the SCP 114 or may transmit the service request message directly to NF Producer_2 403 (direct transmission is not shown in FIG. 4) in operation 417. The service request message may include the event ID indicating the requested event, the UE ID information indicating the information about the UE related to the event, the CCA certificate, and the token received from the NRF 117.

Here, NF Consumer_2 402 may include, in the service request message, the response URI of NF Consumer_1 401 as an address for receiving the notification service for the event for which NF Producer_2 403 associated with the event requested from NF Consumer_1 401 can provide the notification service. When NF Consumer_2 402 includes the response URI of NF Consumer_1 401 in the service request message for requesting the notification service subscription to NF Producer_2 403, NF Consumer_2 402 may attach the CCA certificate of NF Consumer_1 401 received from NF Consumer_1 to enable NF Consumer_1 401 as the owner of the response URI to be identified.

The SCP 114 may transmit the service request message received from NF Consumer_2 402 to NF Producer_2 403 in operation 418.

NF Producer_2 403 may verify the service request message received from NF Consumer_2 402 and the response URI of NF Consumer_1 401 included therein in operation 420, and may reply with acceptance of the service request message when the service request is an appropriate request in operation 421.

Here, NF Producer_2 403 may verify the token and the CCA certificate of NF Consumer_2 402 included in the service request message received in operation 420, thereby authenticating NF Consumer_2 402 that has transmitted the service request message and checking whether NF Consumer_2 402 is an NF that has received access authorization from the NRF 117. Further, NF Producer_2 403 may check the CCA certificate of NF Consumer_1 401 attached with the response URI included in the service request message, thereby identifying whether the owner of the response URI is NF Consumer_1 401 and checking whether NF Consumer_1 401 is an NF that has received authorization to receive the notification service of the event provided by the NF Producer_2 402.

When the notification service subscription is successful, NF Producer_2 403 may store the requested UE information, the event ID, and the response URI in order to provide the notification service to the response URI when the event for the UE occurs.

When the request is not acceptable due to various cases, for example, where NF Consumer_1 401 is an NF type having no authority to receive the notification service or is not authenticated as an appropriate NF, NF Producer_2 403 may reject the request.

A service response message from NF Producer_2 403 may be transmitted to NF Consumer_2 402 via the SCP 114 or directly in operation 421 and operation 422.

When successfully receiving the service response message, NF Consumer_2 (NF the same as NF Producer_1) 402 may reply to the service request message of NF Consumer_1 401 in operation 423 and operation 424.

In another embodiment of the disclosure, NF Producer_1 402 may receive the service request message from NF Consumer_1 401, may successfully verify the authority of NF Consumer_1 401, and may reply to NF Consumer_1 401 with a service response regardless of the service request message exchange with NF Producer_2 403

When the requested event for the requested UE occurs, NF Producer_2 403 may provide the notification service for NF Consumer_1 401 using the stored response URI in operation 425 and operation 426. Here, the notification service may be transmitted directly to NF Consumer_1 401 (not shown in FIG. 4) or may be transmitted through the SCP.

Figure 5:
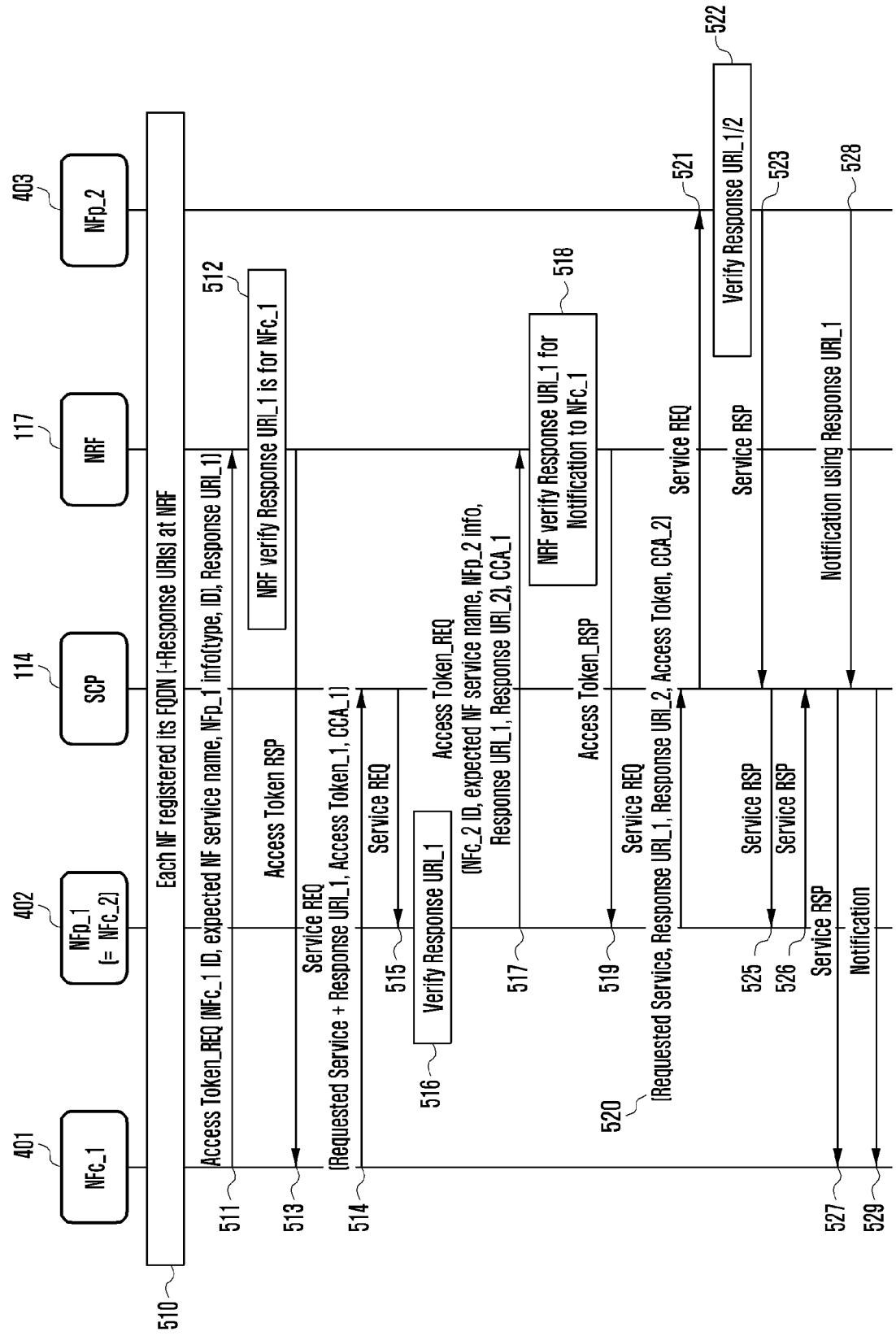
FIG. 5 illustrates an authentication and authorization procedure of a service request and response of a subscription-notification model between network devices using system registration information about a network device according to an embodiment of the present disclosure.

FIG. 5 is a signal flowchart according to an authentication and authorization procedure of a service request and response of a subscription-notification model between network devices using system registration information about a network device according to an embodiment of the present disclosure.

Prior to a description with reference to FIG. 5, the same reference numerals for respective NFs as those used in FIG. 4 will be used. Therefore, the same assumption made in FIG. 4 may also be applied to FIG. 5.

In the embodiment of the disclosure, the NFs may register FQDNs or IP addresses of the NFs in an NRF 117 in advance through an NF registration process (operation 510). Here, the NFs may register pieces of response URI information about the NFs in the NRF 117 in addition to the FQDNs or IP addresses.

According to the embodiment of the disclosure, NF Consumer_1 401 may determine a notification service subscription to NF Producer_1 402 for a specific event for a specific UE or a group of UEs. The specific event may be represented by an event ID.

NF Consumer_1 401 may perform authorization from the NRF 117 to transmit a service request message for a request for the notification service subscription to the NF producer, and may transmit an access token request message to be issued with a token in operation 511. Here, the access token request message may include all or some of the following pieces of information:

NF instance ID and NF type of the NF consumer;
Information about an NF service for which the NF consumer wishes to obtain access authorization; or
Information about the NF type and the NF producer instance ID of the NF producer from which the NF consumer wishes to obtain access authorization.

The NF consumer 300 may include, in the access token get request message, a response URI of the NF consumer indicating an address for receiving a response from the NF producer when using a service of the NF producer.

In operation 512, the NRF 117 may determine authorization for a corresponding token request using the information included in the access token request message and information specified by the expected NF producer (e.g., an NF type of the NF consumer to receive the service) and may issue a token. Here, the NRF 117 may check whether the request is an appropriate request and may determine the authorization by comparing the response URI included in the access token request message with previously registered information of an FQDN, an IP address, or a response URI of NF Consumer_1.

In operation 513, the NRF 117 may transmit a service response message including issued token information to NF Consumer_1 401.

In operation 515, NF Consumer_1 401 may transmit the service request message to a SCP or may directly transmit the service request message to NF Producer_1 402 (not shown in FIG. 5) in order to request the notification service subscription to the NF producer. The service request message may include the event ID indicating the requested event, UE ID information indicating information about a related UE, a CCA certificate, and the token received from the NRF.

In the embodiment of the disclosure, the CCA may include an NF instance ID of the NF consumer, time information indicating the validity period of the certificate, an expected NF type of the NF producer, and a digital certificate of the NF consumer or URL information about the digital certificate. The CCA of the NF may be signed with a signature key.

In operation 515, the SCP 114 transmits the service request message received from NF Consumer_1 401 to NF Producer_1 402.

In operation 516, NF Producer_1 402 may verify the token and the CCA certificate included in the received service request message to authenticate NF Consumer_1 401 that has transmitted the service request message, and may check whether NF Consumer_1 401 is an NF that has received access authorization from the NRF 117.

In another embodiment of the disclosure, when an FQDN or an IP address is included in a digital certificate of the NF producer, NF Producer_1 402 may check whether the response URI included in the service request and the CCA uses a host address indicated by the FQDN or the IP address, thereby checking whether the service request message of NF Consumer_1 401 is an appropriate service request message.

NF Producer_1 402 may determine to need to request a notification service for the event from a different NF producer (NF Producer_2) in order to provide the notification service for the event included in the service request message received from NF Consumer_1 401.

NF Producer_1 402 is an NF consumer (referred to as NF Consumer_2), and may request a token from the NRF 117 to request the service from NF Producer_2 403 in operation 517. Here, the token request may include an ID of NF Consumer_2, a requested NF type of NF Producer_2, and requested NF service information. Further, NF Consumer_2 402 may add the response URI received from NF Consumer_1 401 to the token request as an address for receiving the notification service from NF Producer_2 403. Here, NF Consumer_2 402 may include information of the CCA or the NF instance ID of NF Consumer_1 401 received from NF Consumer_1 401 for notifying the NRF 117 that the response URI is received from NF Consumer_1 401.

The NRF 117 may determine authorization for a corresponding token request using the information included in the access token request message and the information specified by the expected NF producer in operation 518 and may issue a token in operation 519. Here, the NRF 117 may check NF Consumer_1 401 using the response URI of NF Consumer_1 401 included in the access token request message and the CCA information or the NF instance ID information of NF Consumer_1 401 included in the access token request message, may check whether the request is an appropriate request by comparing with previously registered information of the FQDN, the IP address, or the response URI of NF Consumer_1 401, and may determine the authorization for NF Consumer_1 401 to receive the notification service of NF Producer_2 403. Here, the NRF 117 may include the response URI of NF Consumer_1 401 in the token as requested by NF Consumer_2.

After receiving the token from the NRF 117, NF Consumer_2 402 may configure a service request message to request a notification service subscription to NF Producer_2 403, and may transmits the service request message to the SCP 114 or may transmit the service request message directly to NF Producer_2 403 (not shown in FIG. 5) in operation 520. The service request message may include the event ID indicating the requested event, the UE ID information indicating the information about the UE related to the event, the CCA certificate, and the token received from the NRF.

Here, NF Consumer_2 402 may include, in the service request, the response URI of NF Consumer_1 as an address for receiving the notification service for the event for which NF Producer_2 403 can provide the notification service among events associated with the event requested from NF Consumer_1 401.

In operation 521, the SCP 114 may transmit the service request message received from NF Consumer_2 402 to NF Producer_2 403.

In operation 522, NF Producer_2 403 may verify the service request message received from NF Consumer_2 402 and the token and the CCA certificate of NF Consumer_2 402 included therein, thereby authenticating NF Consumer_2 402 that has transmitted the service request message and checking whether NF Consumer_2 402 is an NF that has received access authorization from the NRF 117. Here, NF Producer_2 403 may additionally check that the response URI is a URI authenticated and authorized by the NRF 117, and may perform the foregoing procedures, thereby checking whether the service request message is an appropriate request.

In operation 523, NF Producer_2 403 may reply with acceptance of the service request message when the service request is an appropriate request.

When the notification service subscription is successful, NF Producer_2 403 stores the requested UE information, the event ID, and the response URI in order to provide the notification service to the response URI when the event for the UE occurs.

When the request is not acceptable due to various cases, for example, where NF Consumer_1 401 is an NF type having no authority to receive the notification service or is not authenticated as an appropriate NF, NF Producer_2 403 may reject the request.

A service response message from NF Producer_2 403 may be transmitted to NF Consumer_2 402 via the SCP 114 or directly (not shown in FIG. 5) as illustrated in operation 523 and operation 525.

When successfully receiving the service response message, NF Consumer_2 (NF the same as NF Producer_1) 402 may transmit the service response message to NF Consumer_1 401 in response to the service request of NF Consumer_1 401 in operation 526 and operation 527.

In another embodiment of the disclosure, NF Producer_1 402 may receive the service request message from NF Consumer_1 401, may successfully verify the authority of NF Consumer_1 401, and may reply to NF Consumer_1 401 with a service response message regardless of the service request message exchange with NF Producer_2 403.

When the requested event for the requested UE occurs, NF Producer_2 403 may provide the notification service for NF Consumer_1 401 using the stored response URI in operation 528 and operation 529. Here, the notification service may be transmitted directly to NF Consumer_1 401 (not shown in FIG. 5) or may be transmitted through the SCP 114 as in operation 528 and operation 529 of FIG. 5.

Figure 6:
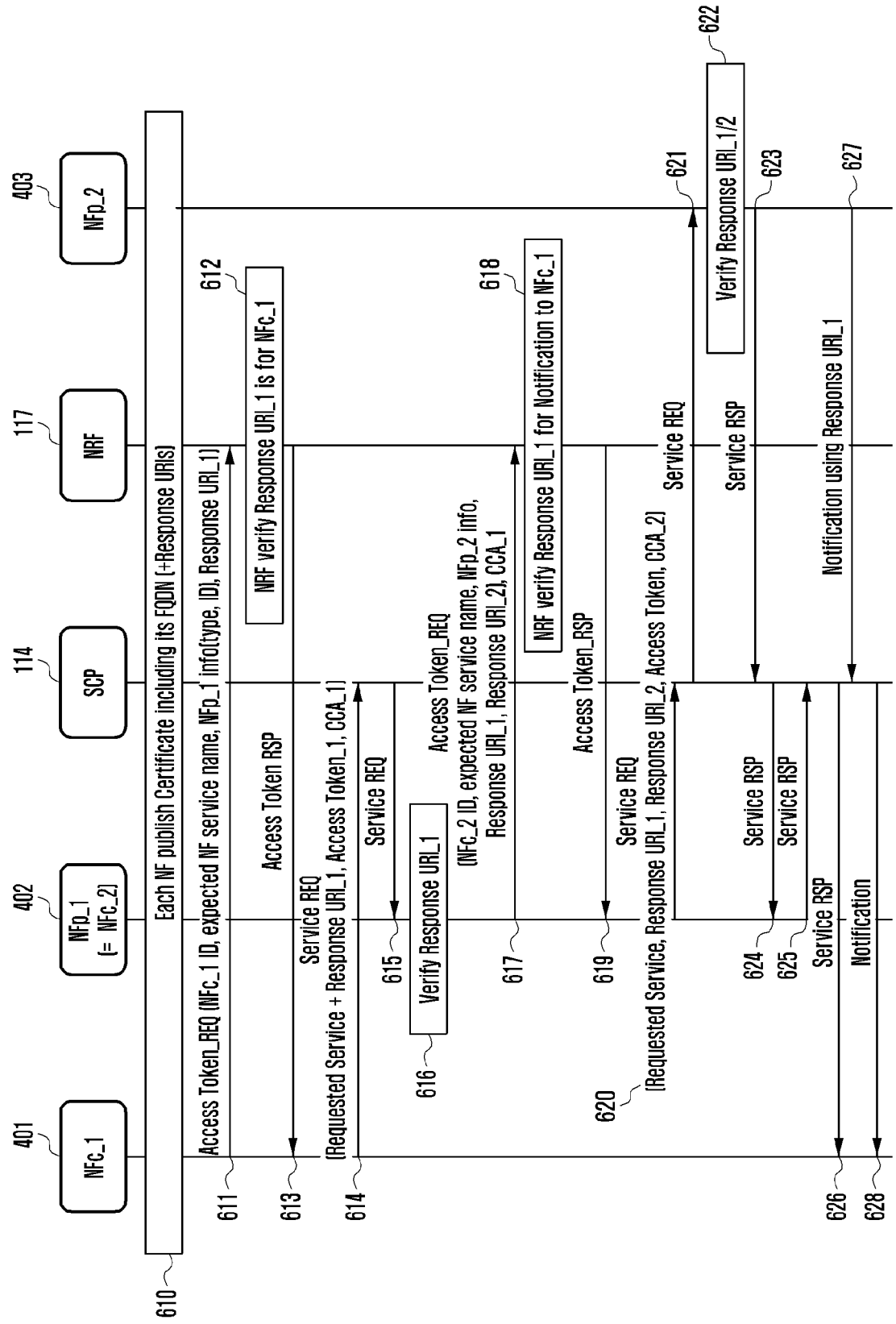
FIG. 6 illustrates an authentication and authorization procedure of a service request and response of a subscription-notification model between network devices using the authentication certificate of a network device according to an embodiment of the present disclosure.

FIG. 6 is a signal flowchart according to an authentication and authorization procedure of a service request and response of a subscription-notification model between network devices using authentication certificate information about a network device according to an embodiment of the present disclosure.

Prior to a description with reference to FIG. 6, the same reference numerals for respective NFs as those used in FIG. 4 will be used. Therefore, the same assumption made in FIG. 4 may also be applied to FIG. 6.

In the embodiment of the disclosure, the NFs may include FQDNs or IP addresses of the NFs in digital certificates of the NFs in operation 610. The NFs may further include pieces of response URI information about the NFs in the digital certificates.

According to the embodiment of the disclosure, NF Consumer_1 401 may determine a notification service subscription to NF Producer_1 402 for a specific event for a specific UE or a group of UEs. The specific event may be represented by an event ID.

In operation 611, NF Consumer_1 401 may perform authorization from an NRF 117 to transmit a service request message for a request for the notification service subscription to the NF producer, and may transmit an access token request message to be issued with a token.

Here, the access token request message may include all or some of the following pieces of information:

NF instance ID and NF type of the NF consumer;

Information about an NF service for which the NF consumer wishes to obtain access authorization; or Information about the NF type and the NF producer instance ID of the NF producer from which the NF consumer wishes to obtain access authorization.

The NF consumer 300 may include, in the access token get request message, a response URI of the NF consumer indicating an address for receiving a response from the NF producer when using a service of the NF producer.

The NRF 117 may determine authorization for a corresponding token request using the information included in the access token request and information specified by the expected NF producer (e.g., an NF type of the NF consumer to receive the service) in operation 612, and may issue a token in operation 613. Here, the NRF 117 may check whether the request is an appropriate request and may determine the authorization by comparing the response URI included in the access token request message with information of the FQDNs, the IP addresses, or the response URIs included in the certificates of the NFs.

In operation 614, NF Consumer_1 401 may transmit the service request message to a SCP 114 or may directly transmit the service request message to NF Producer_1 402 (not shown in FIG. 6) in order to request the notification service subscription to the NF producer 402. The service request message may include the event ID indicating the requested event, UE ID information indicating information about a related UE, a CCA certificate, and the token received from the NRF 117.

In the embodiment of the disclosure, the CCA may include an NF instance ID of the NF consumer, time information indicating the validity period of the certificate, an expected NF type of the NF producer, and a digital certificate of the NF consumer or URL information about the digital certificate. The CCA of the NF may be signed with a signature key.

In operation 615, the SCP 114 may transmit the service request message received from NF Consumer_1 401 to NF Producer_1 402.

In operation 616, NF Producer_1 402 may verify the token and the CCA certificate included in the received service request message to authenticate NF Consumer_1 401 that has transmitted the service request message, and may check whether NF Consumer_1 401 is an NF that has received access authorization from the NRF 117.

In another embodiment of the disclosure, when an FQDN or an IP address is included in a digital certificate of the NF producer, NF Producer_1 402 may check whether the response URI included in the service request message and the CCA uses a host address indicated by the FQDN or the IP address, thereby checking whether the service request message of NF Consumer_1 401 is an appropriate service request message.

NF Producer_1 402 may determine to need to request a notification service for the event from a different NF producer (NF Producer_2) 403 in order to provide the notification service for the event included in the service request message received from NF Consumer_1 401.

NF Producer_1 402 is an NF consumer (referred to as NF Consumer_2), and may request a token from the NRF 117 to request the service from NF Producer_2 403 in operation 617. Here, the token request may include an ID of NF Consumer_2, a requested NF type of NF Producer_2, and requested NF service information. Further, NF Consumer_2 402 may add the response URI received from NF Consumer_1 401 to the token request as an address for receiving the notification service from NF Producer_2 403. Here, NF Consumer_2 402 may include information of the CCA received from NF Consumer_1 for notifying the NRF 117 that the response URI is received from Consumer_1.

The NRF 117 may determine authorization for a corresponding token request using the information included in the access token request message and the information specified by the expected NF producer in operation 618 and may issue a token in operation 619. Here, the NRF 117 may check NF Consumer_1 401 using the response URI of NF Consumer_1 401 included in the access token request message and the CCA information of NF Consumer_1 401 included in the access token request message, may check whether the request is an appropriate request by comparing with information of the FQDN, the IP address, or the response URI of NF Consumer_1 401 registered in the digital certificate of NF Consumer_1, and may determine the authorization for NF Consumer_1 401 to receive the notification service of NF Producer_2 403. Here, the NRF 117 may include the response URI of NF Consumer_1 401 in the token as requested by NF Consumer_2 402.

After receiving the token from the NRF 117 in operation 619, NF Consumer_2 402 may configure a service request message to request a notification service subscription to NF Producer_2 403, and may transmits the service request message to the SCP 114 or may transmit the service request message directly to NF Producer_2 403 (not shown in FIG. 6) in operation 620. The service request message may include the event ID indicating the requested event, the UE ID information indicating the information about the UE related to the event, the CCA certificate, and the token received from the NRF 117.

In another embodiment of the disclosure, NF Consumer_2 402 may add information, such as the CCA certificate of NF Consumer_1 401, the digital certificate of NF Consumer_1, or the URL of the digital certificate, to the service request message in order to check the response URI included in the service request message.

Here, NF Consumer_2 402 may include, in the service request message, the response URI of NF Consumer_1 401 as an address for receiving the notification service for the event for which NF Producer_2 403 can provide the notification service among events associated with the event requested from NF Consumer_1 401.

In operation 621, the SCP 114 may transmit the service request received from NF Consumer_2 402 to NF Producer_2 403.

In operation 622, NF Producer_2 403 may verify the service request message received from NF Consumer_2 402 and the token and the CCA certificate of NF Consumer_2 402 included therein, thereby authenticating NF Consumer_2 402 that has transmitted the service request message and checking whether NF Consumer_2 402 is an NF that has received access authorization from the NRF 117. Here, NF Producer_2 403 may additionally check that the response URI is a URI authenticated and authorized by the NRF 117, and may perform the foregoing procedures, thereby checking whether the service request is an appropriate request.

Further, in operation 622, when the CCA certificate of NF Consumer_1 401, the digital certificate, or the URL of the digital certificate is included, NF Producer_2 403 may check NF Consumer_1 401 by checking the certificate, may check whether the response URI is the response URI of NF Consumer_1 401 by comparing the information of the FQDN, the IP address, or the response URI included in the certificate of NF Consumer_1 401, and may examine whether NF Consumer_1 401 is authorized to receive the notification service of NF Producer_2 403, thereby determining (or identifying) whether the service request is an appropriate request.

In operation 623, operation 624, operation 625, and operation 626, NF Producer_2 403 may reply with acceptance of the service request message when the service request of NF Consumer_2 402 is an appropriate request.

When the notification service subscription is successful, NF Producer_2 403 stores the requested UE information, the event ID, and the response URI in order to provide the notification service to the response URI when the event for the UE occurs.

When the request is not acceptable due to various cases, for example, where NF Consumer_1 401 is an NF type having no authority to receive the notification service or is not authenticated as an appropriate NF, NF Producer_2 403 may reject the request.

A service response message from NF Producer_2 403 may be transmitted to NF Consumer_2 402 via the SCP 114 or directly (not shown in FIG. 6) as described above in operation 623.

When successfully receiving the service response message, NF Consumer_2 (NF the same as NF Producer_1) 402 may transmit the service response message in response to the service request of NF Consumer_1 401 in operation 625 and operation 626.

In another embodiment of the disclosure, NF Producer_1 402 may receive the service request message from NF Consumer_1 401, may successfully verify the authority of NF Consumer_1 401, and may reply to NF Consumer_1 401 with a service response message regardless of the service request message exchange with NF Producer_2 403.

When the requested event for the requested UE occurs, NF Producer_2 403 may provide the notification service for NF Consumer_1 401 using the stored response URI in operation 627. Here, the notification service may be transmitted directly to NF Consumer_1 401 (not shown in FIG. 6) or may be transmitted through the SCP 114 as in operation 627 and operation 628.

Figure 7:
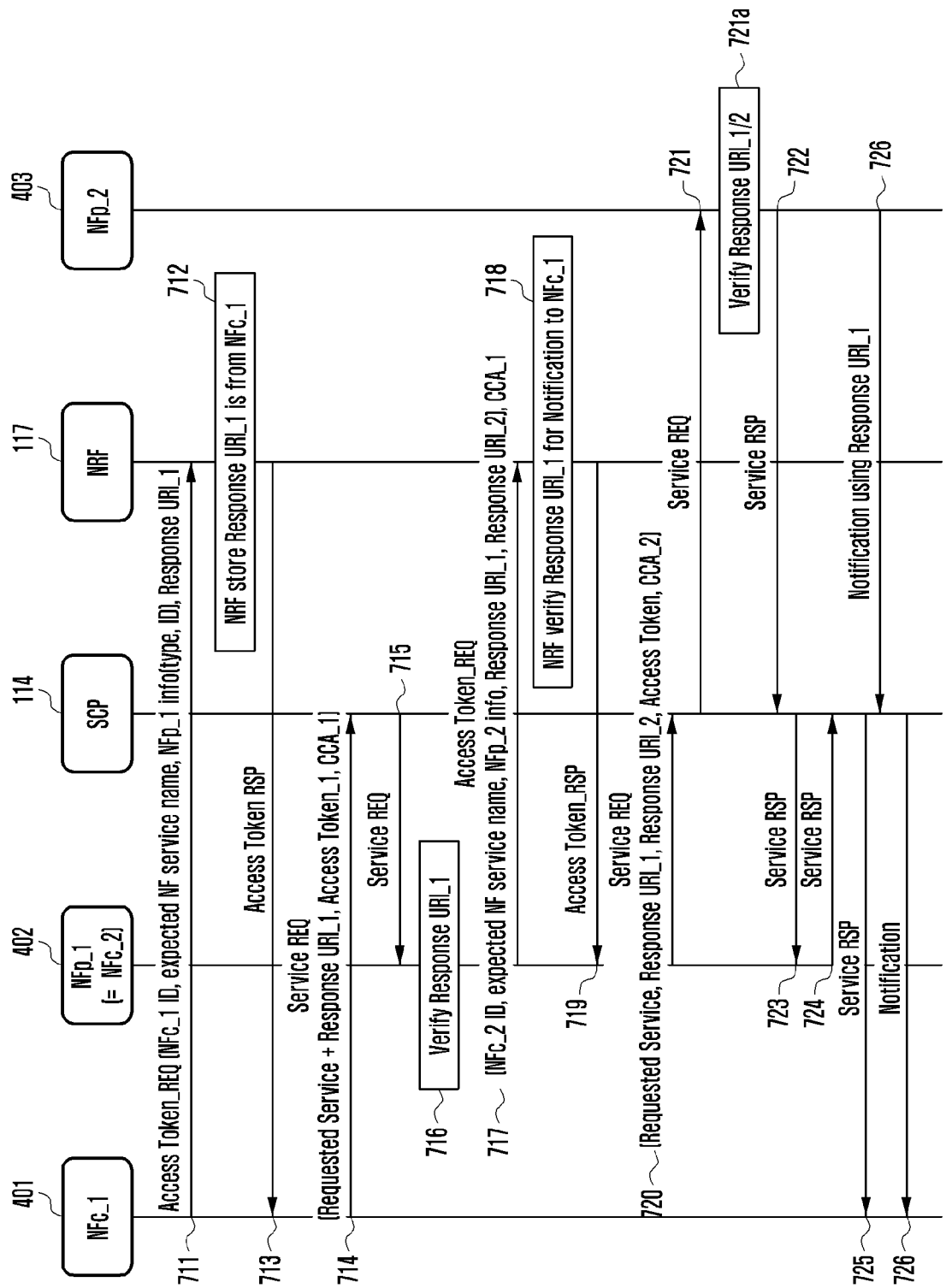
FIG. 7 illustrates an authentication and authorization procedure of a service request and response of a subscription-notification model between network devices using token issue information about a network device according to an embodiment of the present disclosure.

FIG. 7 is a signal flowchart according to an authentication and authorization procedure of a service request and response of a subscription-notification model between network devices using token issue information about a network device according to an embodiment of the present disclosure.

Prior to a description with reference to FIG. 7, the same reference numerals for respective NFs as those used in FIG. 4 will be used. Therefore, the same assumption made in FIG. 4 may also be applied to FIG. 7.

According to the embodiment of the disclosure, NF Consumer_1 401 may determine a notification service subscription to NF Producer_1 402 for a specific event for a specific UE or a group of UEs. The specific event may be represented by an event ID.

In operation 711, NF Consumer_1 401 may perform authorization from an NRF 117 to transmit a service request message for a request for the notification service subscription to the NF producer, and may transmit an access token access request message to be issued with a token.

Here, the access token request message may include all or some of the following pieces of information:

NF instance ID and NF type of the NF consumer;

Information about an NF service for which the NF consumer wishes to obtain access authorization; or Information about the NF type and the NF producer instance ID of the NF producer from which the NF consumer wishes to obtain access authorization.

The NF consumer 300 may include, in the access token get request message, a response URI of the NF consumer indicating an address for receiving a response from the NF producer when using a service of the NF producer.

The NRF 117 may determine authorization for a corresponding token request using the information included in the access token request message and information specified by the expected NF producer (e.g., an NF type of the NF consumer to receive the service) in operation 712, and may issue a token in operation 713.

Here, the NRF 117 may check whether the response URI included in the access token request message is a response URI of the NF consumer by comparing the response URI with an FQDN or an IP Address of the NF consumer. In addition, when the response URI is determined as the correct response URI of NF Consumer_1 401, the NRF 117 may store the corresponding information for a certain period of time.

In operation 714, NF Consumer_1 401 may transmit the service request message to a SCP 114 or may directly transmit the service request message to NF Producer_1 402 (not shown in FIG. 7) in order to request the notification service subscription to the NF producer. The service request message may include the event ID indicating the requested event, UE ID information indicating information about a related UE, a CCA certificate, and the token received from the NRF 117.

In the embodiment of the disclosure, the CCA may include an NF instance ID of the NF consumer, time information indicating the validity period of the certificate, an expected NF type of the NF producer, and a digital certificate of the NF consumer or URL information about the digital certificate. The CCA of the NF is signed with a signature key of the NF.

In operation 715, the SCP 114 transmits the service request message received from NF Consumer_1 401 to NF Producer_1 402.

In operation 716, NF Producer_1 402 may verify the token and the CCA certificate included in the received service request message to authenticate NF Consumer_1 401 that has transmitted the service request message, and may check whether NF Consumer_1 401 is an NF that has received access authorization from the NRF 117.

In addition, NF Producer_1 402 may compare the response URI included in the service request message with information of the response URI included in the token, thereby determining whether the service request message is an appropriate request.

NF Producer_1 402 may determine to need to request a notification service for the event from a different NF producer (NF Producer_2) 403 in order to provide the notification service for the event included in the service request message received from NF Consumer_1 401.

NF Producer_1 402 is an NF consumer (referred to as NF Consumer_2), and may request a token from the NRF 117 to request the service from NF Producer_2 403 in operation 717. Here, the token request may include an ID of NF Consumer_2, a requested NF type of NF Producer_2, and requested NF service information. Further, NF Consumer_2 402 may add the response URI received from NF Consumer_1 401 to the token request as an address for receiving the notification service from NF Producer_2 403. Here, NF Consumer_2 402 may include information of the CCA received from NF Consumer_1 401 for notifying the NRF 117 that the response URI is received from NF Consumer_1 401.

The NRF 117 may determine authorization for a corresponding token request using the information included in the access token request message and the information specified by the expected NF producer in operation 718 and may issue a token in operation 719. Here, the NRF 117 may compare the response URI of NF Consumer_1 401 included in the access token request message and a response URI of NF Consumer_1 401 previously stored by the NRF 117, thereby checking whether the request is an appropriate request and determining the authorization for NF Consumer_1 401 to receive the notification service of NF Producer_2 403 by. Here, the NRF 117 may include the response URI of NF Consumer_1 401 in the token as requested by NF Consumer_2 402.

After receiving the token from the NRF 117, NF Consumer_2 402 may configure a service request message to request a notification service subscription to NF Producer_2, and may transmits the service request message to the SCP 114 or may transmit the service request message directly to NF Producer_2 403 (not shown in FIG. 7) in operation 720. The service request message may include the event ID indicating the requested event, the UE ID information indicating the information about the UE related to the event, the CCA certificate, and the token received from the NRF 117.

Here, NF Consumer_2 402 may include, in the service request message, the response URI of NF Consumer_1 401 as an address for receiving the notification service for the event for which NF Producer_2 403 can provide the notification service among events associated with the event requested from NF Consumer_1 401.

In operation 721, the SCP 114 may transmit the service request message received from NF Consumer_2 402 to NF Producer_2 403.

In operation 721, NF Producer_2 403 may verify the service request message received from NF Consumer_2 402 and the token and the CCA certificate of NF Consumer_2 402 included therein, thereby authenticating NF Consumer_2 402 that has transmitted the service request message and checking whether NF Consumer_2 402 is an NF that has received access authorization from the NRF 117. Here, NF Producer_2 403 may additionally check that the response URI is a URI authenticated and authorized by the NRF 117, and may perform the foregoing procedures, thereby checking whether the service request message is an appropriate request.

In operation 722 and operation 723, NF Producer_2 403 may reply with acceptance of the service request message when the service request is an appropriate request.

When the notification service subscription is successful, NF Producer_2 403 may store the requested UE information, the event ID, and the response URI in order to provide the notification service to the response URI when the event for the UE occurs.

When the service request of NF Consumer_2 402 is not acceptable due to various cases, for example, where there is an error in checking the token, where there is an error in checking the CCA certificate, or where the service for the event cannot be provided, NF Producer_2 403 may reject the request.

A service response message from NF Producer_2 403 may be provided to NF Consumer_2 402 via the SCP 114 or may be provided directly to NF Consumer_2 402 (not shown in FIG. 7) in operation 722 and operation 723.

When successfully receiving the service response message, NF Consumer_2 (NF the same as NF Producer_1) 402 may transmit the service response message to NF Consumer_1 401 in response to the service request message of NF Consumer_1 401 in operation 725.

In another embodiment of the disclosure, NF Producer_1 402 may receive the service request message from NF Consumer_1 401, may successfully verify the authority of NF Consumer_1 401, and may reply to NF Consumer_1 401 with a service response message regardless of the service request message exchange with NF Producer_2 403.

When the requested event for the requested UE occurs, NF Producer_2 403 may provide the notification service for NF Consumer_1 401 using the stored response URI in operation 726 and operation 727. Here, the notification service may be transmitted directly to NF Consumer_1 401 (not shown in FIG. 7) or may be transmitted through the SCP 114 as in operation 726 and operation 727.

Figure 8:
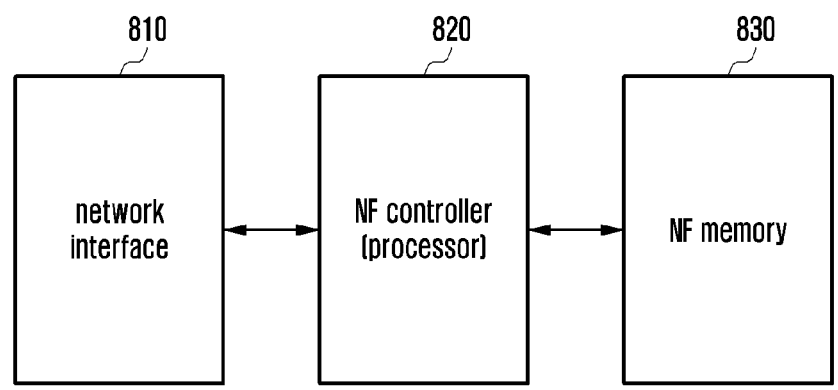
FIG. 8 is a block diagram illustrating the configuration of a network function (NF) device according to various embodiments of the present disclosure.

FIG. 8 is a block diagram illustrating the configuration of a network function (NF) device according to various embodiments of the present disclosure.

Referring to FIG. 8, the NF device may include a network interface 810, an NF controller 820, and an NF memory 830. The network interface 810 may provide an interface for communication with other NFs. For example, when an NF is the AlVIF 112, the network interface 810 may provide an interface for communicating with the SMF 113. In another example, when the NF is the UPF 110, the network interface 810 may provide an interface for transmitting and receiving various data/signals/messages to from the RNA 20 and/or the AMF 112 and/or the DN 180.

The NF controller 820 may control the operation of the corresponding NE For example, the NF controller 820 may perform control corresponding to the operations of the NRs of FIG. 2 to FIG. 7 described above. Further, the NF controller 820 may control operations corresponding to FIG. 9 and FIG. 10 to be described below. For example, when the NF is the NRF 117, the NF controller 820 may control the operation of the NRF 117, when the NF is the NEF 116, the NF controller 820 may control the operation of the NEF 116, and when the NF is the SCP 114, the NF controller 820 may control the corresponding operation. In addition, when the NF is NF Consumer_1 401, the NF controller 820 may control the operations of NF Consumer_1 401 described in FIG. 4 to FIG. 7, and when the NF is NF Consumer_2 and NF Producer_1 402 at the same time, the NF controller 820 may control the operations of NF Consumer_2 and NF Producer_1 described in FIG. 4 to FIG. 7. Similarly, when the NF is NF Producer_2 403, the NF controller 820 may control the operations of NF Producer_2 403 described in FIG. 4 to FIG. 7. In another example, when the NF is an NF consumer 901, the NF controller 820 may control an operation of the NF consumer 901 described in FIG. 9 and FIG. 10. Further, when the NF is an NF producer 902, the NF controller 820 may control an operation of the NF producer 902 described in FIG. 9 and FIG. 10.

The NF memory 830 may store information for controlling the NF, information generated during control, and pieces of information necessary according to the disclosure. In particular, as described above, the NF memory 830 may store control information for operating as an NF consumer and control information for operating as an NF producer Control information. In addition, the NF memory 830 may store the foregoing pieces of information to provide a service for a specific UE.

Figure 9:
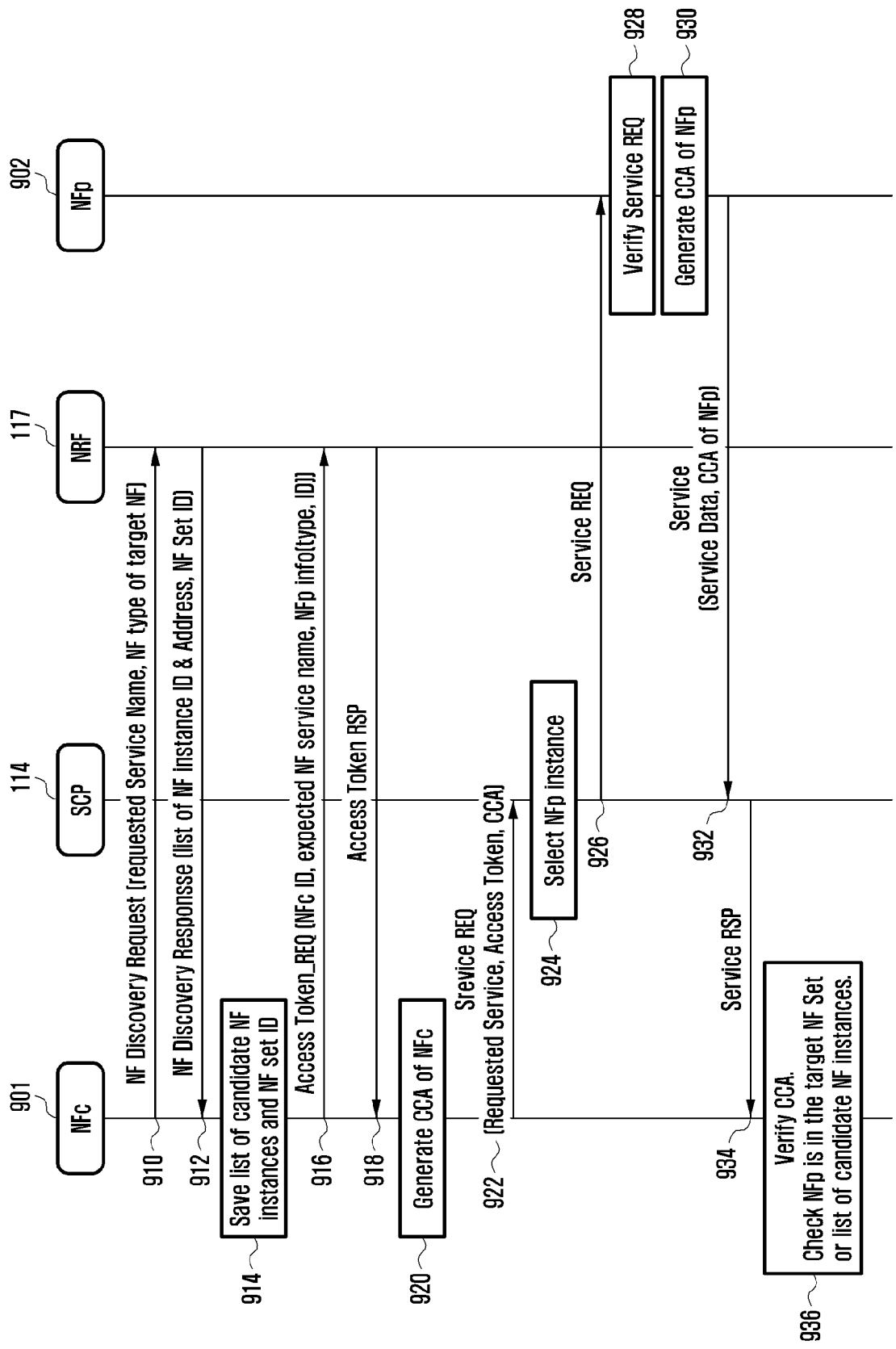
FIG. 9 illustrates an authentication and authorization procedure of a service request and response of a request-response model between network devices using information about a network device set according to an embodiment of the present disclosure.

FIG. 9 is a signal flowchart according to an authentication and authorization procedure of a service request and response of a request-response model between network devices according to an embodiment of the present disclosure.

Prior to a description with reference to FIG. 9, network functions used in the disclosure will be described. First, an NF consumer is shown as NFc 901, and an NF producer is shown as NFp 902. Therefore, in the following description, an NF consumer and NFc may be interchangeably used, and an NF producer and NFp may be interchangeably used. Further, it is assumed that components of the SCP 114 and the NRF 117 described in FIG. 1 are used.

According to the embodiment of the disclosure, an NF consumer may request a specific service for a specific UE 10 or a group of UEs from an NF Producer, and may receive a response. When receiving the service response, the NF consumer may verify whether an NF having transmitted the service response is the NF producer from which the NF consumer expects to receive the service or an NF included in the same NF set as the NF producer from which the NF consumer expects to receive the service. Here, the NF set may include two or more NFs, and different NFs may provide the same service or may provide different services.

The NF consumer 901 determines that the NF consumer 901 needs to receive a service from a different NF, and may transmit an NF discovery request message to the NRF 117 to obtain information about an NF that is able to provide the service in operation 910. The NF discovery request message may include the name of the service requested by the NF consumer 901 and information about the NF type of the NF to provide the service and may be transmitted to the NRF 117.

Upon receiving the NF discovery request message, the NRF 117 may check the requested service and the NF type in the discovery request message, and may transmit an NF discovery response message including information about NFs that are able to provide the service to the NFc 901 in operation 912. The information about the NF(s) that is able to provide the service included in the NF discovery response message may include an NF instance ID referring to a corresponding NF instance and address information (e.g., an FQDN or an IP address) about NF instances. Further, the information may include NF set ID information indicating an NF set to which the NF instances belong. Although the NF instance has been described for illustration in this disclosure, the NF is not necessarily an NF instance. For example, when the NF is not configured as an instance but one server itself is configured as an NF, a server ID and address information (e.g., an FQDN or an IP address) of the server may be provided. That is, an NF instance may be replaced by an NF server, and one NF server and/or one NF instance may be an independent network entity. Hereinafter, for convenience of explanation, it is assumed that an NF is configured as an instance.

In operation 914, the NF consumer 901 may store the information about the NF instance(s) and/or the information about the NF set included in the NF discovery response message as a list of candidate NF instances and information about a target NF set, respectively. The stored information may be used subsequently to verify whether a service response message to be received in response to this information is from an appropriate NF producer.

In operation 916, the NFc 901 may perform authorization from the NRF 117 to transmit a service request message and may transmit an access token request message to be issued with a token. Here, the access token request message may include all or some of the following pieces of information:
NF instance ID and NF type of the NF consumer;

Information about an NF service for which the NF consumer wishes to obtain access authorization; or Information about the NF type and the NF producer instance ID of the NF producer 902 from which the NF consumer wishes to obtain access authorization.

The information of the access token request message may specify information, such as an NF producer instance ID, using the information of the NF instance ID(s) obtained when receiving the NF discovery response message in operation 912.

The NRF 117 may determine authorization for a corresponding token request using the information included in the access token request message received in operation 916 and information specified by the expected NF producer (e.g., an NF type of the NF consumer to receive the service), and may issue a token in operation 918. The access token response message including the issued token may be transmitted from the NRF 117 to the NFc 901 in operation 918.

In another embodiment of the disclosure, a procedure for transmitting the access token request message and receiving the access token response message may be performed before transmitting the NF discovery request message.

The NF consumer 901 may receive the access token response message in operation 918, and may generate a CCA certificate of the NFc 901 in operation 920.

After generating the CCA certificate in operation 920, the NF consumer 901 may transmit a service request message to be transmitted to the NF producer 902 to the SCP 114 in operation 922. The service request message may include information about the requested service, the CCA certificate, and the token received from the NRF 117.

In operation 924, the SCP 114 may select NFp, based on the service request message received in operation 922. In operation 926, the SCP 114 may transmit the service request message received from the NF consumer 901 to NFp selected in operation 924. Here, when an NF producer specified in the service request message received from the NF consumer 901 cannot be identified or the NF producer is not expected to be able to process the service request due to a disconnection from the NF producer, the SCP 114 may retrieve another candidate NF producer to process the service request and may transmit the service request message to the retrieved candidate NF producer as in operation 926.

When retrieving another NF Producer, the SCP 114 needs to retrieve a candidate NF producer in an NF Instance belonging to the same NF set as the NF producer requested by the NF consumer 901.

In operation 928, the NF producer 902 may verify the token and CCA certificate included in the service request message received in operation 926, thereby authenticating the NF consumer 901 having transmitted the service request message and checking whether NF consumer 901 is an NF that has received access authorization from the NRF. In the disclosure, a normal case, that is, where the NF consumer 901 having transmitted the service request message is an NF that has received access authorization from the NRF, is assumed.

In operation 930, NFp 902 may generate a CCA certificate of NFp.

The NF producer 902 may transmit a service response message to the NF consumer 901 via the SCP to provide the requested service to the NF consumer 901 (932 and 934). Here, the NF producer 902 may additionally transmit the CCA certificate generated to authenticate the NF producer 902 in operation 930 to the NF consumer 901 via the service response message.

In the embodiment of the disclosure, the CCA generated by the NF producer 902 may include the NF instance ID of the NF consumer 901, the NF instance ID of the NF producer 902, time information indicating the validity period of the certificate, and a digital certificate of the NF producer or URL information about the digital certificate. The CCA of the NF may be signed with a signature key of the NF.

In operation 934, the SCP 114 may transmit the service response message received from NFp 902 in operation 932 to NFc 901.

After receiving the service response message, NFc 901 may authenticate the NF producer 902 by verifying the CCA certificate of the NF producer 902 in operation 936. Further, during the authentication, NFc 901 may verify whether the NF producer 902 is included in the list of candidate NF instances or the target NF set transmitted through the service request message. As a result of the verification, when the NF producer 902 is included in the list of candidate NF instances or the target NF set transmitted through the service request message, NFc 901 may authenticate whether the service response message is transmitted by an appropriate NF producer.

In another embodiment of the disclosure, the CCA generated by the NF producer 902 (CCA of NFp) may include information indicating the SCP 114 having transmitted the service request message received by the NF producer 902. For example, the CCA may include information, such as the NF instance ID of the SCP 114.

The SCP 114 receiving the service response message including the CCA generated by the NF producer 902 (CCA of NFp) may consider two situations.

In a first case, the SCP 114 indicated by the CCA information (CCA of NFp) generated by the NF producer 902 included in the service response message received by the SCP 114 is the SCP 114 itself. In this case, since the information indicates the SCP 114 itself, the SCP 114 may determine that the received service request message is normal.

In a second case, the SCP indicated by the CCA information (CCA of NFp) generated by the NF producer 902 included in the service response message received by the SCP 114 may be a different SCP (SCP_2) other than the SCP 114. In this case, a simple method may determine (identify) that the service request message is abnormal. However, even when the SCP indicated by the CCA information (CCA of NFp) generated by the NF producer 902 included in the service response message received by the SCP 114 may be the different SCP (SCP_2) other than the SCP 114, the service request message may be normal.

For example, there may be a case where the SCP (SCP_2) requested to transmit the service request message does not directly transmit the service request message to the NF producer 902 but forwards transmission of the service request message to a different SCP (SCP_1). The SCP (SCP_2) requested to transmit the service request message does not directly transmit the service request message to the NF producer 902 but forwards transmission of the service request message to a different SCP (SCP_1), because the NF producer 902 is not located in the area of the SCP (SCP_2) or due to other reasons.

In this case, the SCP indicated by the CCA information (CCA of NFp) generated by the NF producer 902 included in the service response message may indicate SCP_2. Then, SCP_1 may identify whether transmission of the service request message is requested from SCP_2, and may identify using additional information whether the message is an appropriate message when the transmission of the service request message is requested from SCP_2.

Whether the message is an appropriate message may be identified (or verified) using the additional information, for example, by verifying whether the NF consumer 901 transmits the service request message to the NF producer 902 and receives a response transmitted from the NF producer 902 to the NF consumer 901.

When at least one of the above procedures fails to be verified, the service response message may be rejected or NFc 901 may be notified that the service response message has been received from an inappropriate NF producer.

When the NF consumer is notified (informed) from the SCP that the service response has been received from the inappropriate NF producer, the NF consumer determines that the service response is an inappropriate service response, and may then perform a series of required operations.

Figure 10:
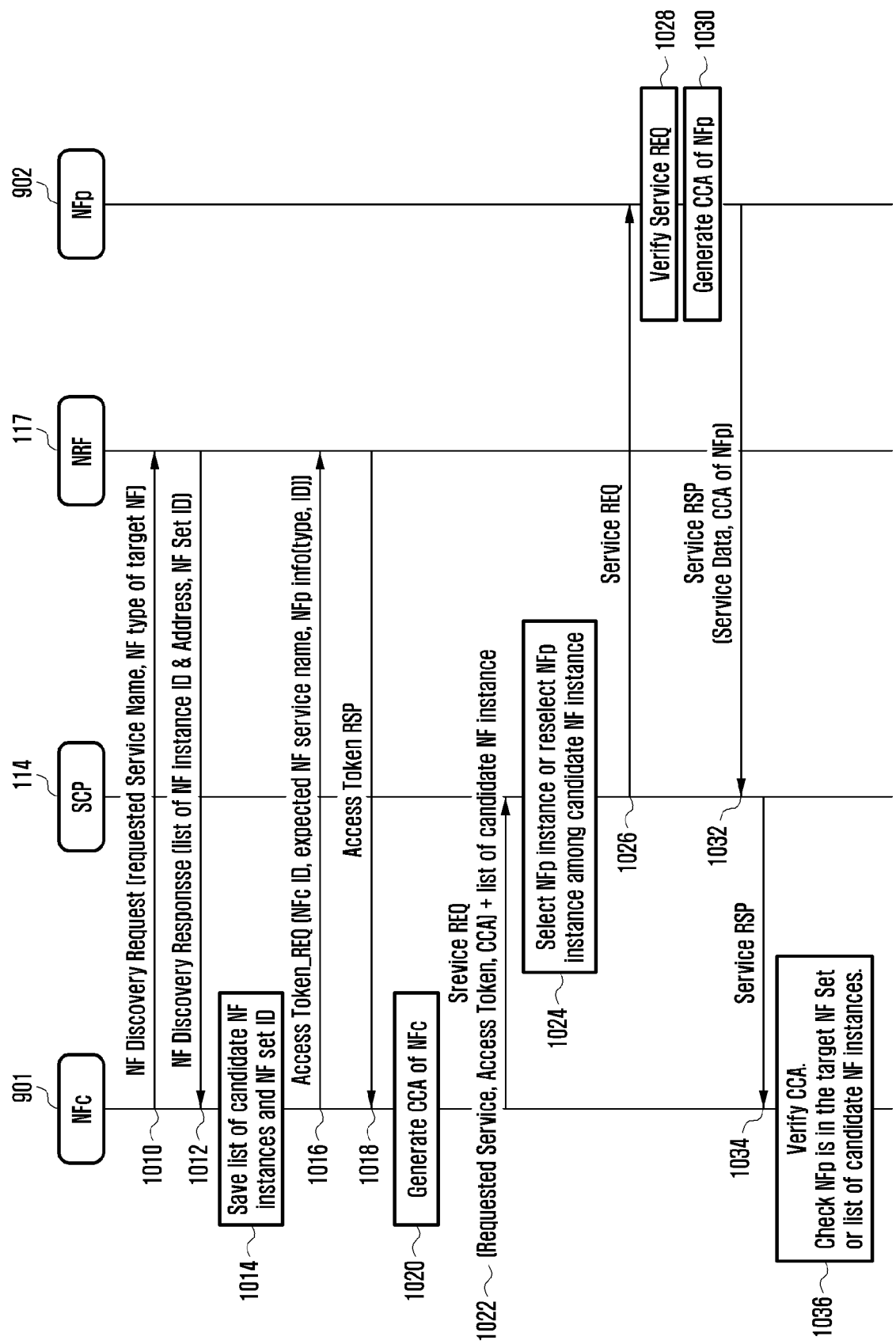
FIG. 10 illustrates an authentication and authorization procedure of a service request and response of a request-response model between network devices using selection of a network device in a network device set according to an embodiment of the present disclosure.

FIG. 10 illustrates an authentication and authorization procedure of a service request and response of a request-response model between network devices using selection of a network device in a network device set according to an embodiment of the present disclosure.

Prior to a description with reference to FIG. 10, network functions used in the disclosure will be described. First, as in FIG. 9, an NF consumer is shown as NFc 901, and an NF producer is shown as NFp 902. Further, it is assumed that components of the SCP 114 and the NRF 117 described in FIG. 1 are used.

According to the embodiment of the disclosure, an NF consumer 901 may request a specific service for a specific UE 10 or a group of UEs from an NF Producer 902, and may receive a response. When receiving the service response, the NF consumer 901 may verify whether an NF having transmitted the service response is the NF producer 902 from which the NF consumer 901 expects to receive the service or an NF included in the same NF set as the NF producer 902 from which the NF consumer 901 expects to receive the service. Here, the NF set may include two or more NFs, and different NFs may provide the same service or may provide different services.

The NF consumer 901 determines that the NF consumer 901 needs to receive a service from a different NF, and may transmit an NF discovery request message to the NRF 117 to obtain information about an NF that is able to provide the service in operation 1010. The NF discovery request message may include the name of the service requested by the NF consumer 901 and information about the NF type of the NF to provide the service and may be transmitted to the NRF 117.

Upon receiving the NF discovery request message, the NRF 117 may check the requested service and the NF type in the NF discovery request message, and may transmit an NF discovery response message including information about NFs that are able to provide the service to the NFc 901 in operation 1012. The information about the NF(s) that is able to provide the service included in the NF discovery response message may include an NF instance ID referring to a corresponding NF instance and address information (e.g., an FQDN or an IP address) about NF instances. Further, the information may include NF set ID information indicating an NF set to which the NF instances belong. Although the NF instance has been described for illustration in this disclosure, the NF is not necessarily an NF instance. For example, when the NF is not configured as an instance but one server itself is configured as an NF, a server ID and address information (e.g., an FQDN or an IP address) of the server may be provided. That is, an NF instance may be replaced by an NF server, and one NF server and/or one NF instance may be an independent network entity. Hereinafter, for convenience of explanation, it is assumed that an NF is configured as an instance.

In operation 1014, the NF consumer 901 may store the information about the NF instance(s) and/or the information about the NF set included in the NF discovery response message as a list of candidate NF instances and information about a target NF set, respectively. The stored information may be used subsequently to verify whether a service response message to be received in response to this information is from an appropriate NF producer.

In operation 1016, the NFc 901 may perform authorization from the NRF 117 to transmit a service request message and may transmit an access token request message to be issued with a token. Here, the access token request message may include all or some of the following pieces of information:

NF instance ID and NF type of the NF consumer;
Information about an NF service for which the NF consumer wishes to obtain access authorization; or
Information about the NF type and the NF producer instance ID of the NF producer 902 from which the NF consumer wishes to obtain access authorization.

The information of the access token request message may specify information, such as an NF producer instance ID, using the information of the NF instance IDs obtained from the NF discovery response message in operation 1012.

The NRF 117 may determine authorization for a corresponding token request using the information included in the access token request message and information specified by the expected NF producer (e.g., an NF type of the NF consumer to receive the service), and may issue a token in operation 918. The access token response message including the issued token may be transmitted from the NRF 117 to the NFc 901 in operation 1018.

In another embodiment of the disclosure, a procedure for transmitting the access token request message and receiving the access token response message may be performed before transmitting the NF discovery request message.

The NF consumer 901 may receive the access token response message in operation 1018, and may generate a CCA certificate of the NFc 901 in operation 1020.

After generating the CCA certificate in operation 1020, the NF consumer 901 may transmit a service request message to be transmitted to the NF producer 902 to the SCP 114 in operation 1022. The service request message may include information about the requested service, the CCA certificate, and the token received from the NRF 117. Here, the NF consumer 901 may transmit, to the SCP 114, the list of candidate NF instances through the service request message or through a separate message along with the service request message. When the list of candidate NF instances is transmitted through the separate message or through a separate field of the service request message, if not connected to the specified NF producer, the SCP 114 may select a different NF instance from the list of candidate NF instances and may transmit the service request message to the selected NF instance. That is, in operation 1024, the SCP 114 may select NFp, based on the service request message received in operation 1022.

The SCP 114 may transmit the service request message received from the NF consumer 901 to the NF producer 902. Here, when the NF producer specified in the service request message received from the NF consumer 901 cannot be identified or the NF producer is not expected to be able to process the service request message due to a disconnection from the NF producer, the SCP 114 may retrieve another candidate NF producer to process the service request message from the received list of candidate NF instances and may transmit the service request message to the retrieved candidate NF producer as in operation 1026.

The NF producer 902 may verify the token and CCA certificate included in the service request message received in operation 1026, thereby authenticating the NF consumer 901 having transmitted the service request message and checking whether NF consumer 901 is an NF that has received access authorization from the NRF 117. In the disclosure, a normal case, that is, where the NF consumer 901 having transmitted the service request message is an NF that has received access authorization from the NRF, is assumed.

In operation 1030, NFp 902 may generate a CCA certificate of NFp.

The NF producer 902 may transmit a service response message to the NF consumer 901 via the SCP 114 to provide the requested service to the NF consumer 901 (1032 and 1034). Here, the NF producer 902 may additionally transmit the CCA certificate for authenticating the NF producer 902, that is, the certificate generated in operation 1030, to the NF consumer 901 via the service response message.

In the embodiment of the disclosure, the CCA generated by the NF producer 902 may include the NF instance ID of the NF consumer 901, the NF instance ID of the NF producer 902, time information indicating the validity period of the certificate, and a digital certificate of the NF producer or URL information about the digital certificate. The CCA of the NF may be signed with a signature key.

In operation 1034, the SCP 114 may transmit the service response received from NFp 902 in operation 1032 to NFc 901.

After receiving the service response message, NFc 901 may authenticate the NF producer 902 by verifying the CCA certificate of the NF producer in operation 1036. Further, during the authentication, NFc 901 may verify whether the NF producer 902 is included in the list of candidate NF instances or the target NF set transmitted through the service request message. As a result of the verification, when the NF producer 902 is included in the list of candidate NF instances or the target NF set transmitted through the service request message, NFc 901 may authenticate whether the service response message is transmitted by an appropriate NF producer.

In another embodiment of the disclosure, the CCA generated by the NF producer may include information indicating the SCP having transmitted the service request received by the NF producer, for example, information, such as the NF instance ID of the SCP.

In another embodiment of the disclosure, the CCA generated by the NF producer 902 (CCA of NFp) may include information indicating the SCP 114 having transmitted the service request message received by the NF producer 902. For example, the CCA may include information, such as the NF instance ID of the SCP 114.

The SCP 114 receiving the service response message including the CCA generated by the NF producer 902 (CCA of NFp) may consider two situations.

In a first case, the SCP 114 indicated by the CCA information (CCA of NFp) generated by the NF producer 902 included in the service response message received by the SCP 114 is the SCP 114 itself. In this case, since the information indicates the SCP 114 itself, the SCP 114 may determine that the received service request message is normal.

In a second case, the SCP indicated by the CCA information (CCA of NFp) generated by the NF producer 902 included in the service response message received by the SCP 114 may be a different SCP (SCP_2) other than the SCP 114. In this case, a simple method may determine (identify) that the service request message is abnormal. However, even when the SCP indicated by the CCA information (CCA of NFp) generated by the NF producer 902 included in the service response message received by the SCP 114 is the different SCP (SCP_2) other than the SCP 114, the service request message may be normal.

For example, there may be a case where the SCP (SCP_2) requested to transmit the service request message does not directly transmit the service request message to the NF producer 902 but forwards transmission of the service request message to a different SCP (SCP_1). The SCP (SCP_2) requested to transmit the service request message does not directly transmit the service request message to the NF producer 902 but forwards transmission of the service request message to a different SCP (SCP_1), because the NF producer 902 is not located in the area of the SCP (SCP_2) or due to other reasons.

In this case, the SCP indicated by the CCA information (CCA of NFp) generated by the NF producer 902 included in the service response message may indicate SCP_2. Then, SCP_1 may identify whether transmission of the service request message is requested from SCP_2, and may identify using additional information whether the message is an appropriate message when the transmission of the service request message is requested from SCP_2.

Whether the message is an appropriate message may be identified (or verified) using the additional information, for example, by verifying whether the NF consumer 901 transmits the service request message to the NF producer 902 and receives a response transmitted from the NF producer 902 to the NF consumer 901.

When at least one of the above procedures fails to be verified, the service response message may be rejected or NFc 901 may be notified that the service response message has been received from an inappropriate NF producer.

When the NF consumer is notified (informed) from the SCP that the service response has been received from the inappropriate NF producer, the NF consumer determines that the service response is an inappropriate service response, and may then perform a series of required operations.

The embodiments disclosed in the specification and the drawings are merely to provide specific examples in order to easily describe the details of the disclosure and to assist understanding of the disclosure and are not intended to limit the scope of the disclosure. Therefore, the scope of the disclosure should be interpreted to include all changes or modifications derived based on the technical idea of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a network function (NF) consumer in a wireless communication system, the method comprising:
   receiving, from an NF repository function (NRF), a discovery response message during a discovery procedure, wherein the discovery response message comprises NF set information including NF instance identifiers (IDs) for providing a service;
   transmitting, to the NRF, an access token request message comprising an NF producer instance ID and a uniform resource identifier (URI) address of the NF consumer;
   receiving, from the NRF, an access token response message comprising an access token;
   transmitting, to a service communication proxy (SCP), a service request message for an NF producer instance, the service request message comprising the access token received from the NRF, a client credentials assertion (CCA) of the NF consumer, the URI address of the NF consumer and the NF set information; and
   receiving, from the SCP, a service response message comprising a CCA of the NF producer instance.

2. The method of claim 1, further comprising:
   determining whether the NF producer instance is included in the service request message; and
   verifying the CCA of the NF producer instance based on a determination that the NF producer instance is included in the service request message.

3. The method of claim 1, wherein the NF producer instance ID included in the access token request message comprises one of the NF instance identifiers included in the NF set information of the discovery response message.

4. The method of claim 1, wherein the discovery response message corresponds to a discovery request message comprising information related to a service requested by the NF consumer.

5. The method of claim 1, wherein the access token request message comprises at least one of NF consumer-related information, NF service-related information, or NF producer-related information.

6. A network function (NF) consumer in a wireless communication system, the NF consumer comprising:
   a network interface configured to communicate with at least one NF;
   memory; and
   at least one processor operably coupled to the memory, the at least one processor configured to control the network interface to:
   receive, from an NF repository function (NRF), a discovery response message during a discovery procedure, wherein the discovery response message comprises NF set information including NF instance identifiers (IDs) for providing a service,
   transmit, to the NRF, an access token request message comprising an NF producer instance ID and a uniform resource identifier (URI) address of the NF consumer,
   receive, from the NRF, an access token response message comprising an access token,
   transmit, to a service communication proxy (SCP), a service request message for an NF producer instance, the service request message comprising the access token received from the NRF, a client credentials assertion (CCA) of the NF consumer, the URI address of the NF consumer and the NF set information, and
   receive, from the SCP, a service response message comprising a CCA of the NF producer instance.

7. The NF consumer of claim 6, wherein the at least one processor is further configured to:
   determine whether the NF producer instance is included in the service request message; and
   verify the CCA of the NF producer instance based on a determination that the NF producer instance is included in the service request message.

8. The NF consumer of claim 6, wherein the NF producer instance ID included in the access token request message comprises one of the NF instance identifiers included in the NF set information of the discovery response message.

9. The NF consumer of claim 6, wherein the discovery response message corresponds to a discovery request message comprising information related to a service requested by the NF consumer.

10. The NF consumer of claim 6, wherein the access token request message comprises at least one of NF consumer-related information, NF service-related information, or NF producer-related information.

* * * * *